(12) United States Patent
Dunbar et al.

(10) Patent No.: US 6,310,740 B1
(45) Date of Patent: Oct. 30, 2001

(54) DISK DRIVE INCLUDING N-CURRENT PREAMPLIFIER FOR GENERATING N-INDEPENDENTLY CONTROLLED WRITE CURRENTS

(75) Inventors: Gary L. Dunbar, Gilroy; Brian Tanner, San Jose; David P. Turner, Los Gatos, all of CA (US)

(73) Assignee: Western Digital Technologies, INC, Lake Forest, CA (US)

( * ) Notice: Subject to any disclaimer, the term of this patent is extended or adjusted under 35 U.S.C. 154(b) by 0 days.

(21) Appl. No.: 09/342,670

(22) Filed: Jun. 29, 1999

(51) Int. Cl.$^7$ ........................................ G11B 5/09
(52) U.S. Cl. .................. 360/46; 360/68; 360/75
(58) Field of Search ................ 360/46, 75, 67, 360/68

(56) References Cited

U.S. PATENT DOCUMENTS

| | | |
|---|---|---|
| 4,414,589 | 11/1983 | Oliver et al. . |
| 4,669,004 | 5/1987 | Moon et al. . |
| 5,339,204 | 8/1994 | James et al. . |
| 5,448,429 | 9/1995 | Cribbs et al. . |
| 5,465,182 | 11/1995 | Ishikawa . |
| 5,488,518 | 1/1996 | Shier . |
| 5,687,036 | * 11/1997 | Kassab ................................ 360/53 |
| 5,726,821 | 3/1998 | Cloke et al. . |
| 5,784,296 | 8/1998 | Baker et al. . |
| 5,790,331 | * 8/1998 | Aranovsky ......................... 360/46 |
| 5,793,554 | 8/1998 | Chainer et al. . |
| 5,796,542 | 8/1998 | Szeremeta . |
| 5,875,064 | 2/1999 | Chainer et al. . |
| 5,880,901 | 3/1999 | Smith et al. . |
| 5,896,239 | * 4/1999 | Maki et al. ......................... 360/46 |
| 6,101,053 | * 8/2000 | Takahashi .......................... 360/46 |

* cited by examiner

Primary Examiner—David Hudspeth
Assistant Examiner—Dan I. Davidson
(74) Attorney, Agent, or Firm—Milad G Shara, Esq.

(57) ABSTRACT

A disk drive comprising a plurality of recording surfaces and plurality of associated heads is disclosed employing a n-current preamplifier for generating n independently controlled write currents. For example, the n-current preamplifier may be employed during manufacturing of the disk drive to simultaneously write servo sectors to all of the recording surfaces in a "bank servo write" mode. The n-current preamplifier comprises an input for receiving a plurality of current-setting control signals corresponding to the plurality of heads, and a plurality of signal-to-current converters for converting the current-setting control signals into a plurality of write currents for the heads, wherein each write current has a magnitude that is independently controlled by a respective one of the current-setting control signals. The optimal write current for each head is determined during a calibration mode wherein a test pattern is written to and read from the disk to generate a quality metric indicative of the quality of the write current setting. Several write current settings are tested for each head, and the write current that generates the best quality metric for each head is used to simultaneously write the servo sectors to the recording surfaces.

14 Claims, 15 Drawing Sheets

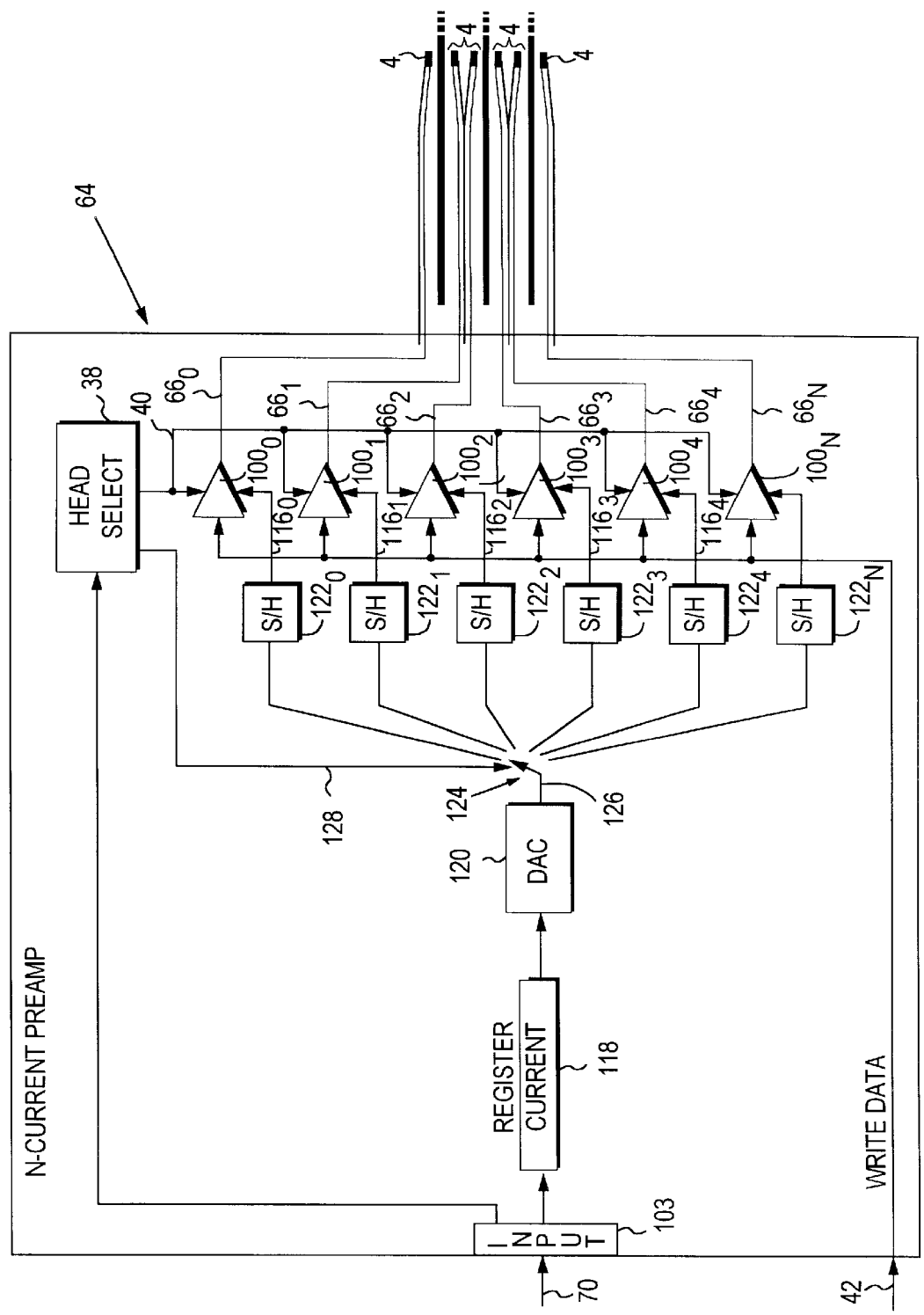

DISK DRIVE INCLUDING N-CURRENT PREAMPLIFIER FOR GENERATING N-INDEPENDENTLY CONTROLLED WRITE CURRENTS

BACKGROUND OF THE INVENTION

1. Field of the Invention

The present invention relates to disk drives. More particularly, the present invention relates to a disk drive comprising a n-current preamplifier for generating n-independently controlled write currents for a plurality of heads.

2. Description of the Prior Art

Magnetic disk drives for computer systems typically employ an array of disks and associated read/write heads together with head positioning and spindle mechanics. This arrangement of heads and fixed disk array is referred to as a head disk assembly or HDA, an overview of which is provided in FIG. 1A. Several magnetic disks 2 connected in an array are rotated by a spindle motor. Each recording surface (top and bottom) of each magnetic disk is accessed through a dedicated head 4; as the disks spin, a thin layer air-bearing forms between the heads 4 and the recording surface such that the heads 4 are said to "fly" just above the recording surface. The heads 4 are connected to the distal end of actuator arms 6 which are connected to a pivot 8 actuated by a rotary voice coil motor (VCM). As the VCM rotates the actuator arms 6 about the pivot 8, the heads 4 are positioned radially over the recording surface so that information can be written to and read from the recording surface.

The recording surface of the magnetic disk is coated with a thin film medium (e.g., cobalt alloy) which is magnetized inductively by a write coil of the head 4. The digital data being recorded modulates a current passing through the write coil in order to inductively write a series of magnetic transitions onto the disk surface (recording surface) of the disk, where a preamplifier chip incorporated within the HDA performs the modulation function in response to the digital data. As shown in FIG. 1B, the data is written in the radially spaced, concentric tracks 10 which are partitioned into blocks of data referred to as data sectors 12. Because the circumferential recording area increases from the inner to outer diameter tracks, more data can be stored in the outer diameter tracks. Thus, in order to maintain a more constant linear bit density and thereby maximize the overall storage capacity, the recording surface is normally partitioned into a number of zones where each zone comprises a predetermined number of tracks. Data is then written to the recording surface at an increasing rate as the head traverses radially from the inner to outer diameter zones, thereby increasing the amount of data stored in the outer diameter tracks. This is illustrated in FIG. 1B which shows a disk partitioned into an inner diameter zone 14 comprising seven data sectors per track, and an outer diameter zone 16 comprising fourteen data sectors per track. In practice, the recording surface is actually partitioned into several zones with the data rate incrementally increasing from the inner to outer diameter zones in order to exploit the maximum storage capacity of the recording surface.

Typically the magnetic disks 2 also comprise servo sectors 18 which are recorded at a regular interval and interleaved with the data sectors 12 as shown in FIG. 1B. A servo sector, as shown in FIG. 1C, typically comprises a preamble 20 and sync mark 22 for synchronizing to the servo sector; a servo data field 24 comprising coarse position information, such as a Gray coded track address, used to determine the radial location of the head with respect to the plurality of tracks; and a plurality of servo bursts 26 recorded at precise intervals and offsets from the track centerlines which provide fine head position information. When writing or reading data, a servo controller performs a "seek" operation to position the head over a desired track; as the head traverses radially over the recording surface, the Gray coded track addresses in the servo data field 24 provide coarse position information for the head with respect to the current and target track. When the head 4 reaches the target track, the servo controller performs a tracking operation wherein the servo bursts 26 provide fine position information used to maintain the head over the centerline of the track as the digital data is being written to or read from the recording surface.

The servo sectors 18 are written to the recording surfaces as part of the manufacturing process to enable the seek and tracking operations necessary to write and read the data sectors 12. A common mechanism for writing the servo sectors to the recording surfaces is an external servo track writer which uses the write preamplifier electronics and heads within the HDA, but which uses separate control circuitry and servo mechanics for radially positioning the heads using well known techniques such as a laser interferometer. A significant cost reduction can be achieved by a "self-servowriting" method which can use circuitry in the disk drive for writing the servo sectors.

It is desirable to expedite the process of writing the servo sectors 18 to the array of recording surfaces within each disk drive to maximize manufacturing throughput. It is known to write the servo sectors 18 to all of the recording surfaces simultaneously by using a technique referred to as "bank servo writing" wherein the write current generated by the preamplifier is applied to all of the heads to simultaneously write the servo sectors to all of the recording surfaces rather than one surface at a time. This is illustrated by the prior art preamplifier shown in FIG. 4 wherein a register 28 is loaded with a digital write current setting converted into an analog write current setting 30 by a digital-to-analog converter (DAC) 32. The analog write current setting 30 adjusts the output current of driver circuits ($34_0$–$34_N$) which supply the respective write currents ($36_0$–$36_N$) to the heads 4. Head select circuitry 38 within the preamplifier enables the output of the appropriate driver circuit ($34_0$–$34_N$) over line 40 during normal operation of the disk drive, and it enables the output of all the driver circuits ($34_0$–$34_N$) during servo track writing in order to write the servo sectors to all of the recording surfaces simultaneously. The digital write data 42 to be recorded to the surface of the disk 2 modulates the operation of the driver circuits ($34_0$–$34_N$) by alternating the polarity of the write current 36; for example, a digital "1" bit may modulate a positive write current and a digital "0" may modulate a negative write current.

Noise in the disk drive (electronic noise, media noise, intersymbol interference, etc.) may induce errors when reading the track addresses and/or servo bursts which will degrade the performance of the disk drive by increasing seek times as well as increasing the bit error rate if the head is unable to maintain proper centerline tracking. Therefore, when the servo sectors are written to the recording surfaces, it is important that enough write current is supplied to each head to saturate the magnetic material on the recording surface so as to maximize the signal power during read back. Prior art servo track writers that perform a bank servo write to all of the recording surfaces simultaneously would set the write current high enough to ensure that each head would be driven by enough current to saturate the recording surfaces. Setting the write current higher than the minimum required to saturate the recording surface does not significantly reduce the signal-to-noise ratio when using a conventional inductive head which comprises a single coil for both writing and reading the magnetic transitions. This is because the poles in a conventional inductive head are essentially the same width which results in minimal fringing fields emanating from the periphery of the write gap even if the write current is set higher than necessary. This is not the case, however, with magneto-resistive (MR) heads which comprise an inductive write element (write coil) and a MR read element integrated into one head. In typical MR heads having two poles, one pole of the inductive write element is shared with one of the shields for the MR read element; this pole is consequently wider than the other pole of the inductive write element which causes significant fringing fields at the periphery of the write gap if the write current is set too high. Further, the amount of write current necessary to saturate the recording surface varies between the MR heads in the disk array due to process variations in manufacturing the MR heads and the magnetic disks. Thus, using the prior art preamplifier of FIG. 4 to drive all the MR heads with a single write current high enough to ensure that all of the recording surfaces are saturated may inevitably drive at least one of the MR heads with too much write current and cause significant fringing fields.

The fringing fields, if strong enough, will effectively erase an area of the disk at the periphery of the write gap thereby forming an "erase band" along the edges of the servo sector data as well as the servo bursts. This is illustrated in FIG. 2A which shows the two write poles of an MR head, where the second write pole is shared with a shield of the MR read element and therefore is wider than the first write pole. The view of the MR head in FIG. 2A is looking up from the disk with the direction of the MR head and orientation of the track vertical to the page. In addition to the flux lines generated in the write gap between the two poles of the inductive write coil, flinging fields are generated at the periphery of the write gap due to the disparate pole widths. As illustrated, the flinging fields arc from the write pole forming flux lines perpendicular to the track which can effectively erase the recording surface. The width of the adverse flinging fields extends to the critical flux line, the flux line strong enough to change the magnetization of the recording surface, which is proportional to the strength of the write current. In FIG. 2A, the write current is too high causing wide erase bands at the edges of the track. A more optimal write current is shown in FIG. 2B which is just strong enough to generate flux in the write gap to saturate the recording surface along the track, while creating only a narrow erase band due to the attenuated fringing fields.

The magnetic transitions in the servo track addresses are recorded using a phase coherent Gray code meaning that the magnetic transitions in the track addresses of adjacent tracks differ by only two adjacent bit cells so that there is no intertrack interference when the head is between tracks during a seek operation. An erase band caused by the flinging fields of an MR head interferes with the accurate detection of the track addresses by disrupting the phase coherent nature of the Gray code. In addition, the erase band at the edges of the servo bursts introduces a non-linear distortion in the position error signal generated during tracking which offsets the centerline position of the head preventing optimal detection of the data sectors.

Furthermore, the characteristics of the storage medium may change from the inner diameter tracks to the outer diameter tracks such that more or less write current may be necessary to saturate the recording surface depending on the head's radial location. In addition, since the head traverses in an arc trajectory, the characteristics of the erase band formed by the fringing field may vary depending on the radial location of the head. As the head traverses radially over the disk, the poles of the write element will skew from the track centerline depending on the head's arc trajectory, which changes the characteristic of the erase band.

There is, therefore, the need to determine the optimal write current while servo track writing a magnetic disk to ensure that the recording surface is saturated while avoiding erase bands caused by fringing fields when the write current is set too high. Further, there is a need to simultaneously write the servo sectors to a plurality of recording surfaces in a disk array (bank servo write) so as to maximize the manufacturing throughput. In addition, there is a need to optimize the write current with respect to the radial location of the head to compensate for the varying characteristics of the magnetic media as well as the varying characteristics of the erase bands as the head skews from the track centerline.

SUMMARY OF THE INVENTION

The invention can be regarded as a n-current preamplifier for use in a disk drive comprising a plurality of recording surfaces and a corresponding plurality of heads. The n-current preamplifier includes an input for receiving a plurality of current-setting control signals corresponding to the plurality of heads. The n-current preamplifier further includes a plurality of signal-to-current converters for converting the current-setting control signals into a plurality of write currents for the heads. Each write current has a magnitude that is independently controlled by a respective one of the current-setting control signals.

The invention can also be regarded as a disk drive comprising a plurality of recording surfaces and a plurality of heads corresponding to the plurality of recording surfaces. The disk drive includes a n-current preamplifier comprising an input for receiving a plurality of current-setting control signals corresponding to the plurality of heads. The n-current preamplifier further includes a plurality of signal-to-current converters for converting the current-setting control signals into a plurality of write currents for the heads. Each write current has a magnitude that is independently controlled by a respective one of the current-setting control signals.

BRIEF DESCRIPTION OF THE DRAWINGS

FIG. 5D shows yet another alternative embodiment for the n-current preamplifier of FIG. 5A which further reduces the circuitry used to generate the independent write currents by using a single register-DAC pair and a plurality of sample-and-hold (S/H) circuits for sampling the output of the DAC, wherein the DAC's register is set with the independent write current settings just prior to writing a servo sector to the recording surfaces.

DESCRIPTION OF THE PREFERRED EMBODIMENTS

System Overview

Figure 3A:
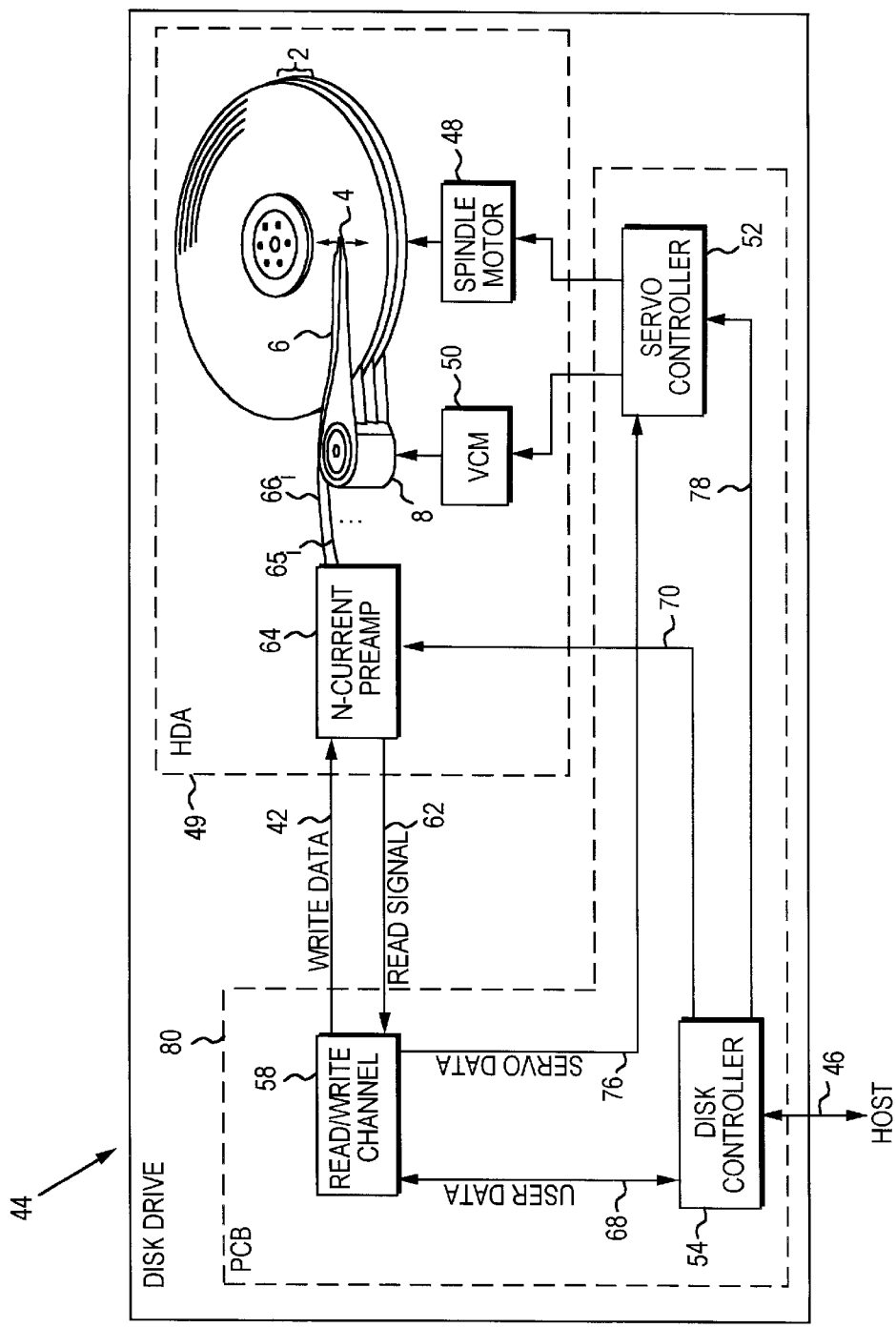
FIG. 3A is a block diagram of a disk drive comprising a HDA together with a read/write channel, disk controller and servo controller mounted on a printed circuit board (PCB), wherein the HDA comprises an-current preamplifier for generating independent write currents optimized for each head.

An overview of a disk drive 44 employing the aspects of the present invention is shown in FIG. 3A. The disk drive 44 is connected to a host computer via interface connection 46. The host computer transmits user data to be stored to the disk drive, and receives information read from the disk drive 44. The user data is stored on the recording surfaces of an array of magnetic disks 2 rotated by a spindle motor 48 located inside an HDA 49. A voice coil motor (VCM) 50 actuates a pivot 8 to rotate an array of actuator arms 6 with a plurality of heads 4 attached to the actuator arms 6 in order to position the heads 4 radially over the recording surfaces. Heads 4 comprise an inductive write coil for writing magnetic transitions on the recording surface, and a magneto-resistive (MR) read element for reading the magnetic transitions.

Figure 1A:
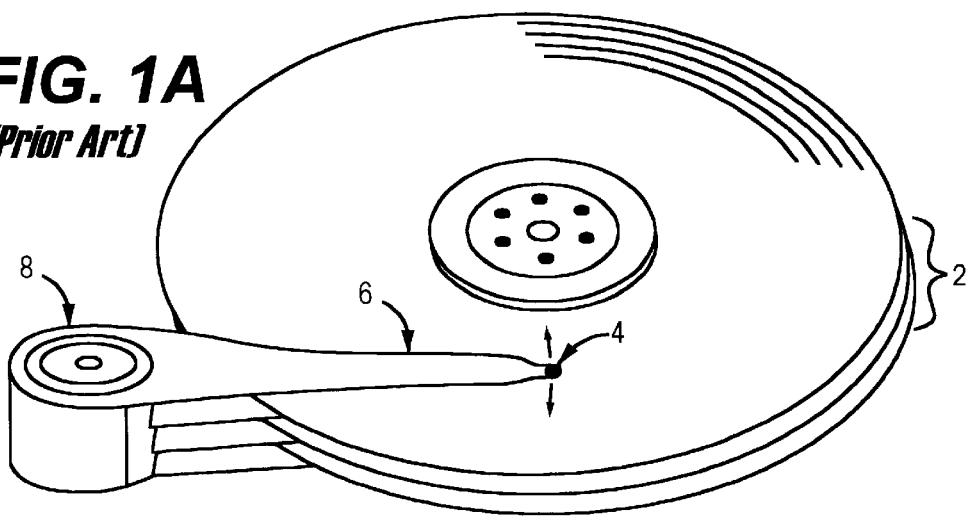
FIG. 1A illustrates a conventional head disk assembly (HDA) within a conventional disk drive comprising an array of disks and associated heads positioned radially over the disk surfaces.
Figure 1B:
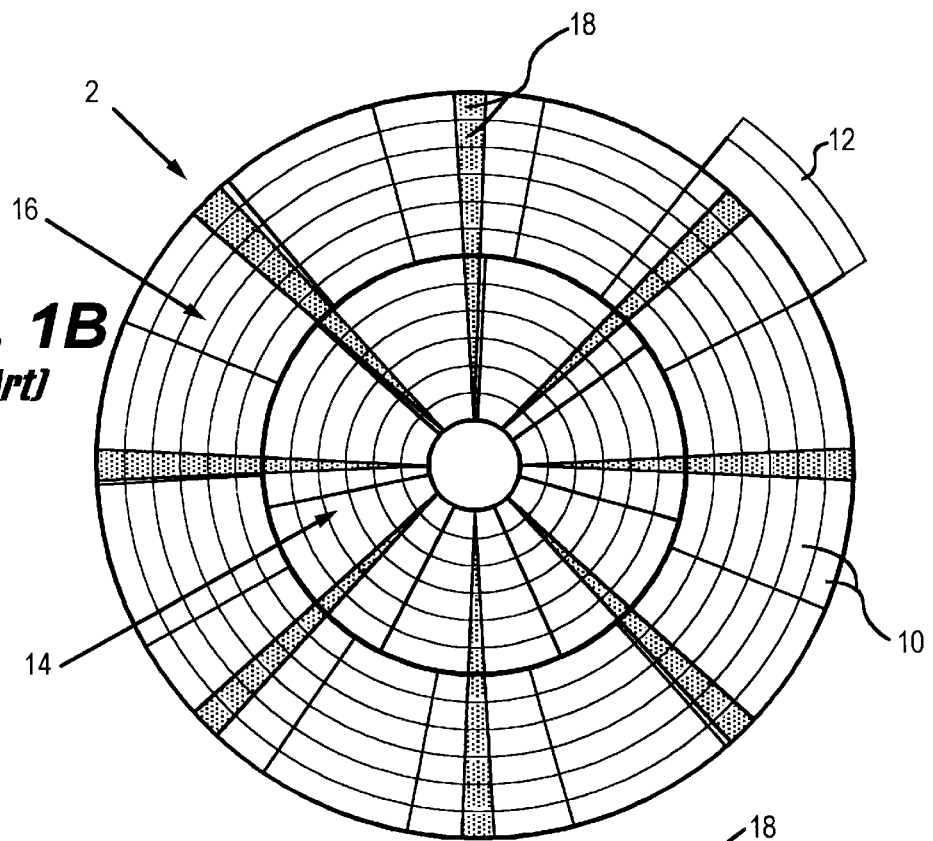
FIG. 1B shows a typical format for one of the disk surfaces in the disk array of FIG. 1A comprising a plurality of radially spaced, concentric data tracks partitioned into a number of data sectors and further comprising embedded servo sectors for positioning the heads over the disk surfaces while seeking and tracking.
Figure 1C:
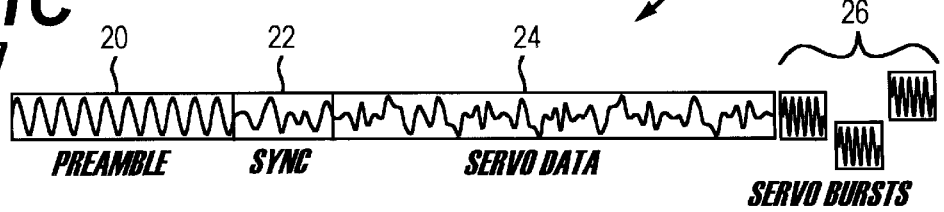
FIG. 1C shows a typical format of an embedded servo sector comprising a preamble and sync mark for synchronizing to a servo data field comprising coarse track positioning information such as a track address, and further comprising servo bursts recorded at precise intervals and offsets with respect to the track's centerline which provide fine position information during tracking.
Figure 2A:
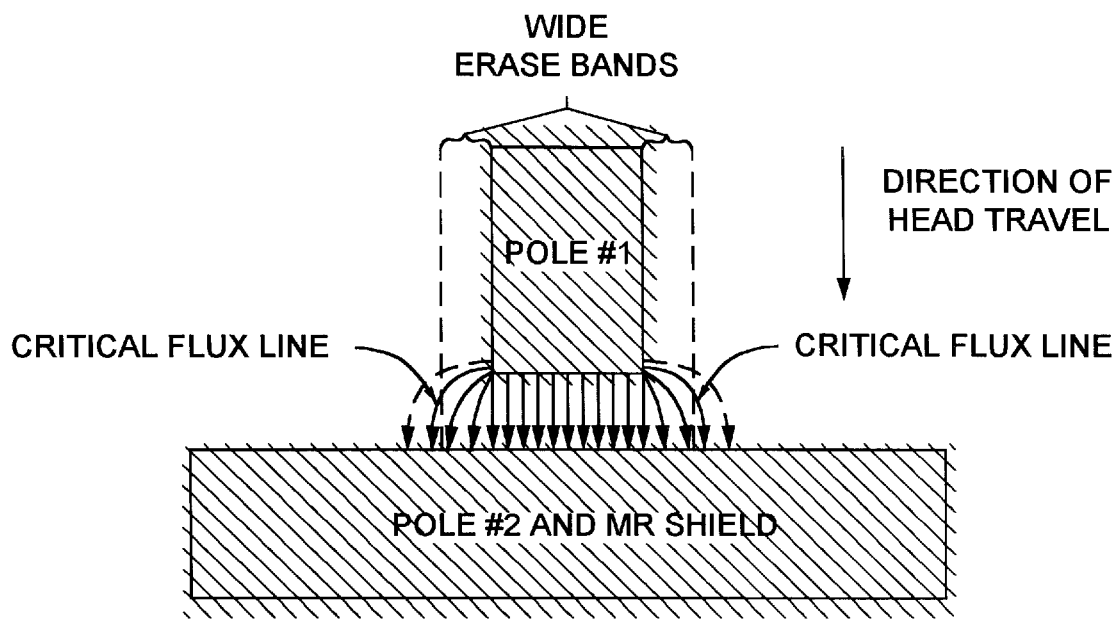
FIG. 2A illustrates the geometry of the write poles in a magneto-resistive (MR) head and how the disparity in the width of the write poles generates flinging fields at the periphery of the write gap which results in wide erase bands at the edges of the servo tracks if the write current is set too high.
Figure 2B:
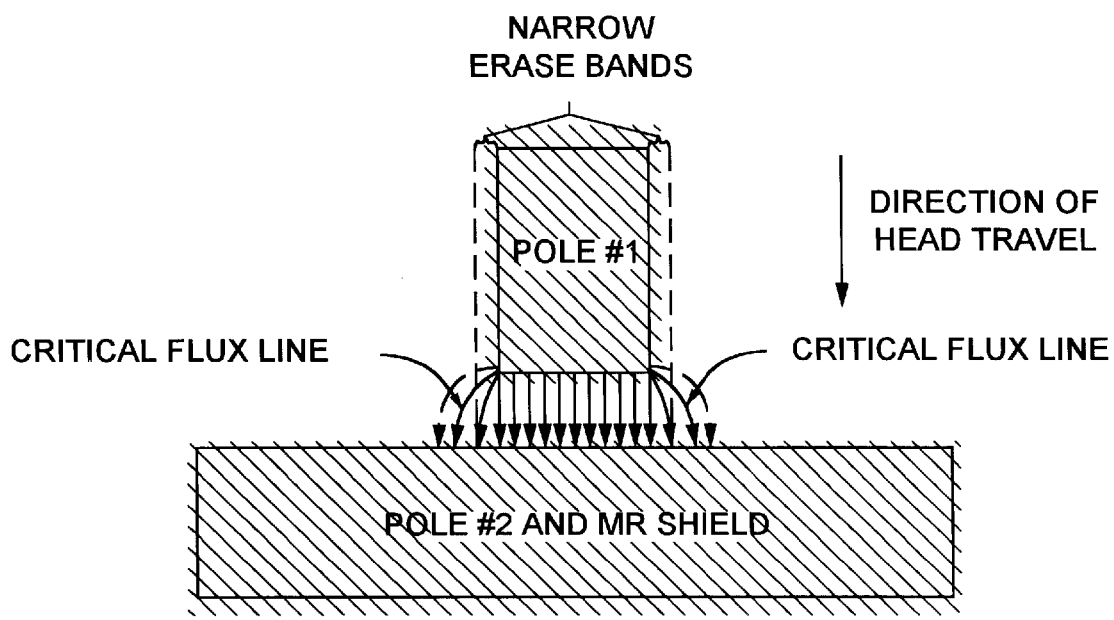
FIG. 2B illustrates how the erase bands are attenuated in the MR head of FIG. 2A by optimizing the write current.

The recording surfaces of the magnetic disks 2 comprise a plurality of concentric, radially spaced tracks 10 partitioned into a number of data sectors 12 as illustrated in FIG. 1B. User data is written to the recording surface a data sector at a time; the recording surfaces comprise servo sectors 18 which facilitate positioning the head 4 over a desired data sector within a particular track 10. A servo controller 52 includes a track positioning system that processes Gray coded track addresses within the servo sectors 18 to position the head 4 with respect to the tracks 10 during seek operations, and it processes servo bursts within the servo sectors 18 to maintain the head over the centerline of the track (tracking) as data is written to or read from the disk 2. The VCM 50 for positioning the heads 4 is precisely controlled by the servo controller 52 in response to a position error formed from the track address and servo burst information. The servo controller 52 also includes a spindle motor control system that controls a spindle motor 48 which rotates the array of magnetic disks. The spindle motor 48 is controlled by the servo controller 52 when the disk drive is initially powered on in order to "spin-up" the disk array. During normal operation, the servo controller 52 controls the spindle motor 48 so that the disk array rotates at a substantially constant angular velocity.

A disk controller 54 coordinates the operation of the disk drive by handling the host interface functions when a host request to write or read data is received, and controlling other components in the disk drive to effectuate the write and read operations to and from the disks 2. A read/write channel 58 comprises encoding circuitry for encoding the data prior to writing the digital write data 42 to the disk 2, as well as signal processing circuitry for processing the analog read signal 62 when reading data from the disk 2.

An-current preamplifier 64 (the details for which are described below) generates the write currents $66_i$ for each head 4 during write operations, and it preamplifies the analog read signal $65_i$ emanating from the head 4 during read operations.

During a write operation, user data to be written to the disk 2 is encoded using an error correction code (ECC), such as the well known Reed-Solomon code, which during read operations is used to detect and correct errors in the data due to noise induced by the electronics and other imperfections in the recording/read-back process. The ECC encoding is suitably carried out by the disk controller 54 which then transfers the ECC encoded data to the read/write channel 58 over line 68. The read/write channel 58 may further encode the ECC data using a channel code, such as a run-length limited (RLL) channel code, designed to enhance the performance of the disk drive by placing certain constraints on the recorded data which increases the effective signal-to-noise ratio (SNR) during read back. The encoded write data is transferred over line 42 to the n-current preamplifier 64 where it modulates the write current $66_i$ in an inductive write coil of the head 4 in order to write a series of magnetic transitions on the recording surface of the disk 2 which represent the recorded data. For example, a "1" bit may modulate a positive write current and a "0" bit may modulate a negative write current. The disk controller 54 programs the n-current prearnplifier 64 with a head select signal over line 70 for selecting the appropriate head 4 when the encoded user data is written to a particular recording surface.

During a read operation, the MR element in the head 4 senses the magnetic transitions recorded on the recording surface of disk 2 and generates analog read signal 65i comprising polarity alternating pulses representing the recorded digital data. The n-current preamplifier 64 preamplifies the analog read signal $65_i$ and transmits analog read signal 62 to the read/write channel 58. The read/write channel 58 comprises circuitry for evaluating the pulses in the analog read signal 62 in order to demodulate the recorded data. It may comprise a simple analog peak detector for detecting isolated pulses in the analog read signal 62, or it may comprise a partial response/maximum likelihood (PRML) detector which samples the analog read signal 62 and then estimates the recorded digital data by evaluating the signal samples in context to determine a most likely data sequence associated with the signal samples. The preferred embodiment is to use the PRML read/write channel because it reduces the error rate for a given SNR and thus the overall storage capacity of the disk drive. After detecting an estimated data sequence from the analog read signal 62, a channel decoder in the read/write channel 58 decodes the estimated data sequence which is then transferred to the disk controller 54 over line 68 for ECC decoding. After ECC decoding and integrity verification, the decoded user data is transferred to the host via the disk drive interface 46.

In FIG. 3A, the read/write channel 58 also detects the data in the servo sectors 18 which is transferred to the servo controller 52 over line 76 for positioning the heads 4 with respect to the tracks 10 during both read and write operations (seeking and tracking). During seeks, the servo controller 52 computes a coarse position error as the difference between the current track location of the head 4 as specified by the track address in the servo data field 24 of the servo sector 18, and a target track provided by the disk controller 54 over line 78. When the head 4 reaches the target track, the servo controller 52 computes a position error signal (PES) with respect to the track centerline from the position information provided by the servo bursts 26; the servo controller 52 makes fine adjustments to the VCM 50 in order to drive the PES to zero and thereby maintain centerline tracking while reading data from or writing data to the disk 2.

The n-current preamplifier 64 is typically implemented as a separate integrated chip located inside the HDA 49 near the actuator arms 6 of the actuator assembly in order to minimize noise interjected into the read/write signal over lines 65 and 66 which connect the n-current preamplifier 64 to the heads 4. The remaining components shown in FIG. 3A, the read/write channel 58, disk controller 54, and servo controller 52 may be implemented as separate chips or as a single integrated chip typically mounted on printed circuit board (PCB) 80 attached to the bottom of the HDA 49 and connected to the n-current preamplifier 64 through a cable conductor. To minimize the number of pins and associated cost of the n-current preamplifier 64, the interface between the n-current preamplifier 64 and other circuitry located on the PCB (read/write channel 58 and disk controller 54) is preferably implemented using a serial interface.

Figure 3B:
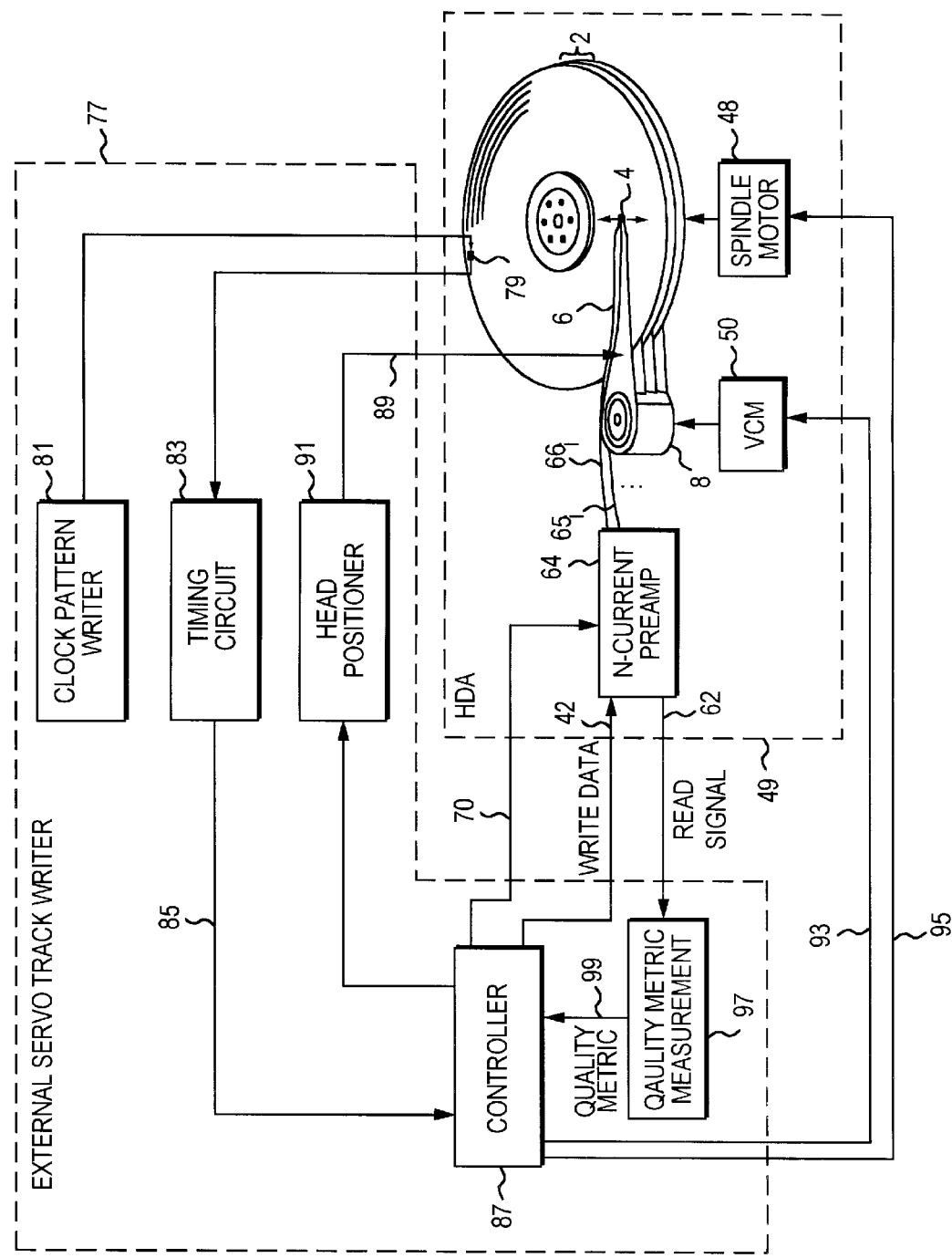
FIG. 3B shows the HDA of FIG. 3A inserted into an external servo track writer during manufacturing which calibrates the optimal write currents for each head in the disk array and then simultaneously writes the servo sectors to all of the recording surfaces in a bank servo write mode.

During the manufacture of the disk drive 44 shown in FIG. 3A, either an external servo track writer or self-servowriting is employed to simultaneously write the servo sectors 18 to all of the recording surfaces using the n-current preamplifier 64. FIG. 3B shows the HDA 49 of FIG. 3A inserted into an external servo track writer 77 before the PCB 80 has been mounted to the HDA 49. The external servo track writer 77 comprises a "clock head" 79 positioned over one of the recording surfaces and a clock pattern generator 81 for writing a magnetic clock pattern in a track preferably at an outer diameter of the recording surface. When bank writing the servo sectors 18, the magnetic clock pattern is read by the clock head 79 and processed by a timing circuit 83 which generates a timing clock 85 applied to a controller 87. The controller 87 preferably processes the timing clock 85 to derive the precise circumferential location of the heads 4 with respect to the tracks so that the servo sectors 18 are written at the same circumferential location from the inner to outer diameter tracks. Other suitable methods are known in the art for generating the timing clock 85, including an optical clock pattern recorded on an inner diameter of a recording surface which is read using an optical transducer comprising a light source and a photodetector.

The external servo track writer 77 further comprises a push pin 89 which is inserted into the HDA 49 and into a hole in the actuator arm 6. A head positioner circuit 91, suitably comprising a very fine resolution stepper motor, actuates the push pin 89 in order to precisely position the heads 4 radially over the disk 2 while writing the servo sectors (servo data and servo bursts). The controller 87 applies a reverse direction bias current to the coil of the VCM 50 over line 93 in order to bias the actuator arm 6 against the push pin 89 to facilitate precise positioning of the heads 4. The controller 87 also applies a current to the coil of the spindle motor 48 over line 95 in order to spin up the disks 2 and then rotate the disks 2 at a substantially constant angular velocity.

Before writing the servo sectors 18 to the recording surfaces of the disks 2, the controller 87 executes a calibration procedure (the details of which are set forth below with respect to FIGS. 8A and 8B) in order to determine optimal write current-setting control signals for the plurality of heads 4. The calibration procedure executed by the controller 87 involves programming the current preamplifier 64 over line 70 with a write current-setting control signal for a particular head 4, writing a test pattern (write data 42) to the respective recording surface, reading the test pattern, and processing the read signal 62 to generate a quality metric indicative of the quality of the write current setting. Several write current-setting control signals are tested for each head 4, and the write current-setting control signals that generate the best (optimal) quality metric are used during the bank servo write operation. The external servo track writer 77 comprises a quality metric measurement circuit 97 for processing the read signal 62 to generate the quality metric 99 evaluated by the controller 87 during the calibration process. The quality metric measurement circuit 97 preferably computes an overwrite measurement which provides an indication of how well the write current saturates the recording surface. As explained in greater detail below, the overwrite measurement involves writing a low frequency test pattern to the recording surface and measuring the energy in the read signal at the low frequency upon read back, overwriting the low frequency test pattern with a high frequency test pattern, measuring the residual energy in the low frequency component of the read signal upon read back, and taking the ratio of the first low frequency energy measurement to the residual low frequency measurement (after the overwrite) to generate the overwrite measurement. The quality metric measurement circuit 97 (in analog or discrete-time) filters the read signal 62 and measures the energy in the read signal 62 to generate the overwrite quality metric 99. Once the optimal write current-setting control signals have been determined for each head 4 in the disk array, the controller 87 programs the n-current preamplifier 64 over line 70 with the optimal write current-setting control signals and then performs the bank servo write operation by simultaneously writing the servo sectors 18 to all of the recording surfaces using the precise timing clock 85. The servo sector data is passed from the controller 87 over write data line 42, through the n-current preamplifier 64, and over lines 66 connecting the n-current preamplifier 64 to the write coil of the heads 4.

Figure 3C:
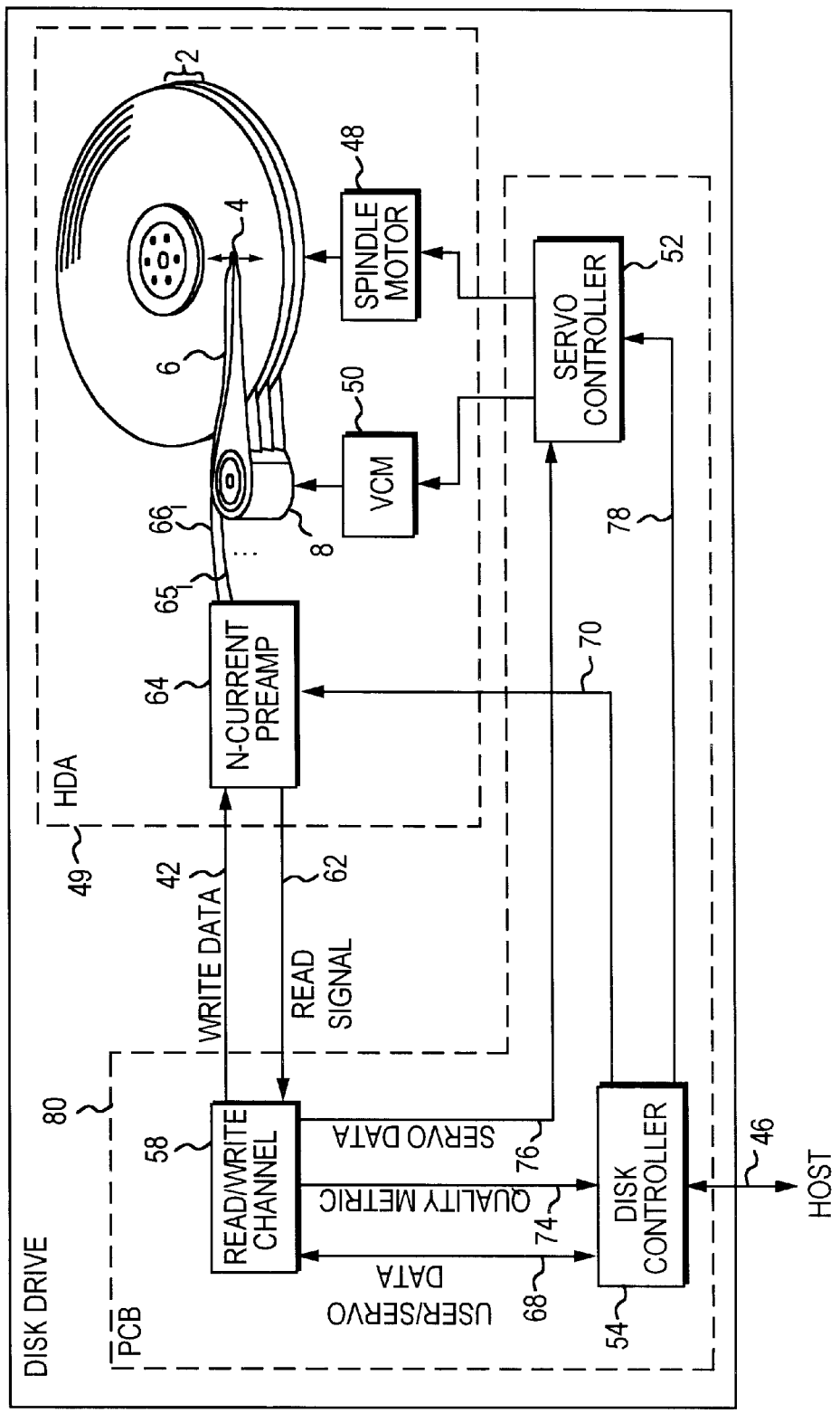
FIG. 3C shows a disk drive employing "self-servowriting" to write the servo sectors to all of the recording surfaces during manufacturing by calibrating the optimal write currents and performing the bank servo write operation internal to the disk drive.

An alternative method for writing the servo sectors to the recording surfaces of the disks 2 during manufacturing is to utilize the disk controller 54, read/write channel 58, and servo controller 52 already integrated into the disk drive 44 of FIG. 3A to "self-servo write" the servo sectors 18. This technique suitably entails an iterative process wherein each servo track is written using information from a previously written servo track. As shown in FIG. 3C, the disk controller 54 executes the calibration procedure and bank servo write operation described below. During the calibration procedure the disk controller 54 programs the n-current preamplifier 64 over line 70 to select the appropriate head 4 and to set the appropriate write current-setting control signal, and the quality metric 74 used to calibrate the optimal write current setting is generated by the read/write channel 58. When bank servo writing the servo sectors 18, the disk controller 54 programs the n-current preamplifier 64 over line 70 with the optimal write current-setting control signals for all of the heads 4 and then simultaneously writes the servo sectors 18 to all of the recording surfaces. The servo sector data is transferred over fine 42 from the disk controller 54 through the read/write channel 58 (unmodified) to the n-current preamplifier 64 and over lines 66 connecting the n-current preamplifier 64 to the write coil of the heads 4.

N-Current Preamplifier

Figure 5A:
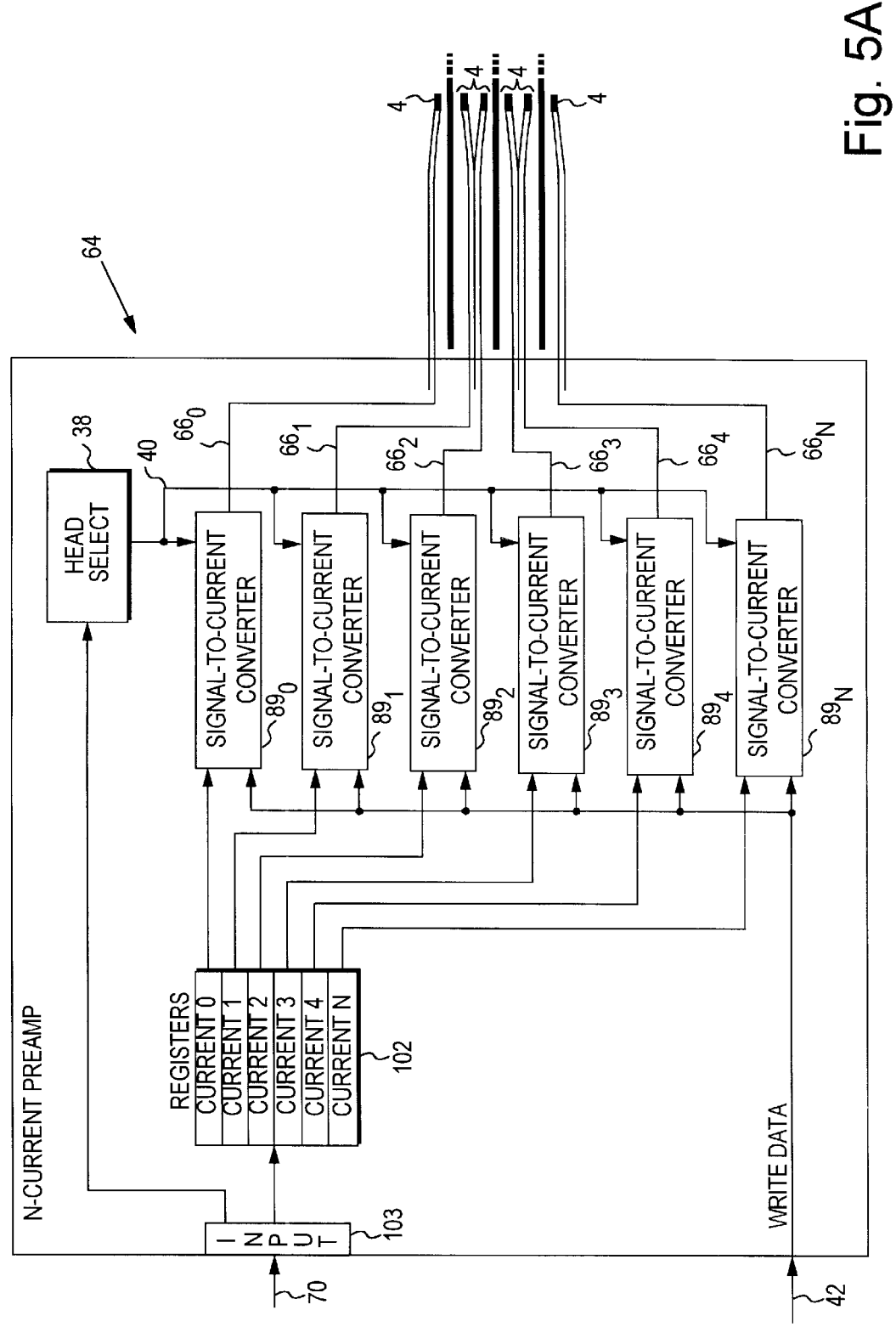
FIG. 5A is a block diagram of the n-current preamplifier of FIG. 3A comprising an input for receiving a plurality of current-setting control signals, and a plurality of signal-to-current converters for converting the current-setting control signals into independent write currents.

With reference to FIG. 5A, n-current preamplifier 64 comprises an input 103 for receiving a plurality of current-setting control signals over line 70, and a plurality of signal-to-current converters ($89_0$–$89_N$) for converting the current-setting control signals into a plurality of write currents ($66_0$–$66_N$) for the heads 4, wherein each write current ($66_0$–$66_N$) has a magnitude that is independently controlled by a respective one of the current-setting control signals. A head select control signal is also received over line 70 and applied to a head select circuit 38 which selects all of the heads 4 when bank servo writing the servo sectors to all of the recording surfaces, and selects the appropriate head 4 when writing a user data sector to a particular recording surface during normal operation. The write data received over line 42 to be written to the recording surface are input into the signal-to-current converters ($89_0$–$89_N$) to modulate the write currents ($66_0$–$66_N$); for example, a "1" bit may modulate a positive write current and a "0" bit a negative write current in the coil of the head 4. In the embodiment shown in FIG. 5A, the current-setting control signals received over line 70 are stored in respective registers 102 and then converted into the appropriate write currents ($66_0$–$66_N$) by the signal-to-current converters ($89_0$–$89_N$). Several example embodiments of the signal-to-current converters ($89_0$–$89_N$) are illustrated in FIGS. 5B–5C.

Figure 4:
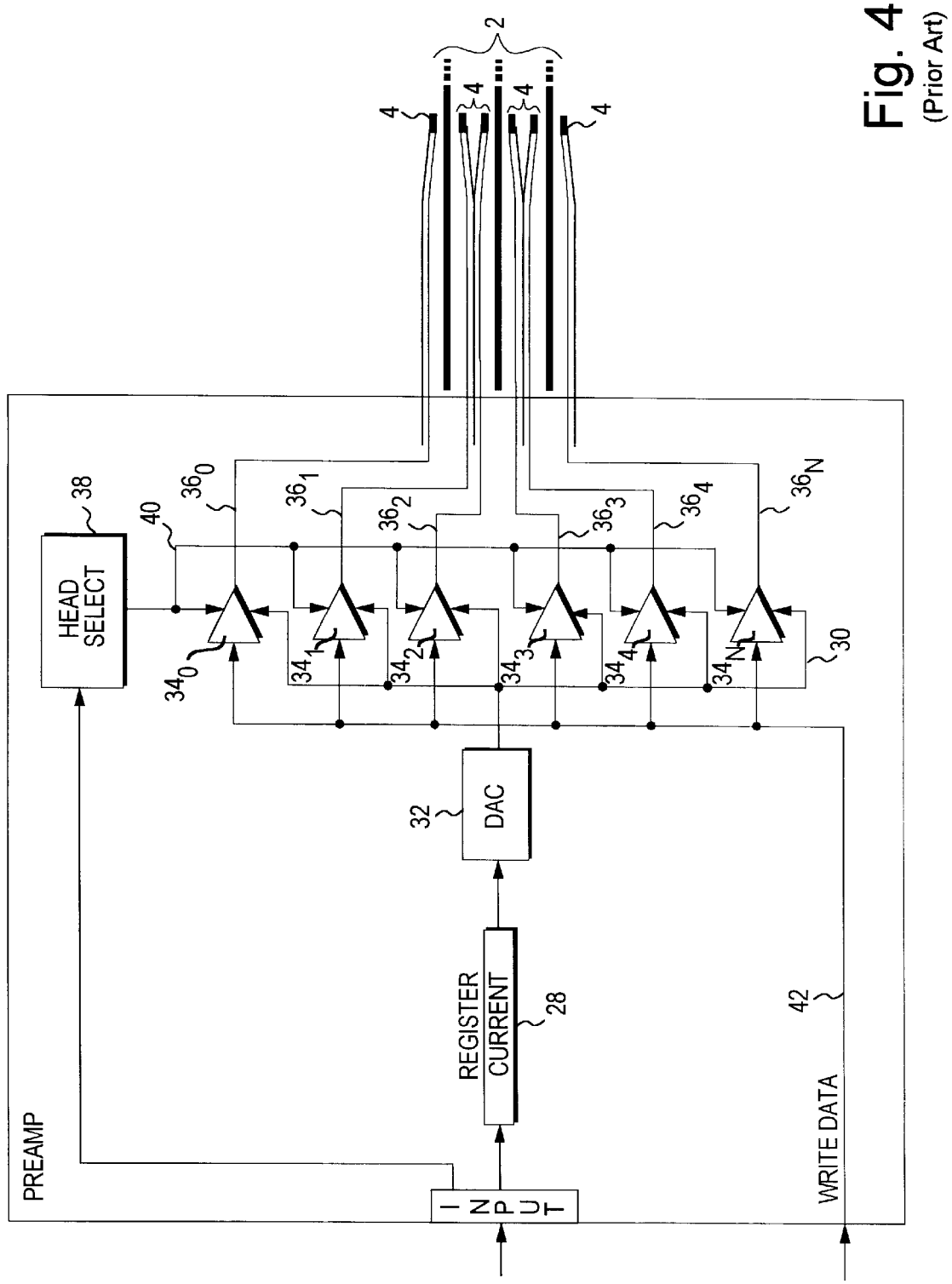
FIG. 4 illustrates the composition of a conventional preamplifier which generates the same write current for each head while bank servo writing the disk array.
Figure 5B:
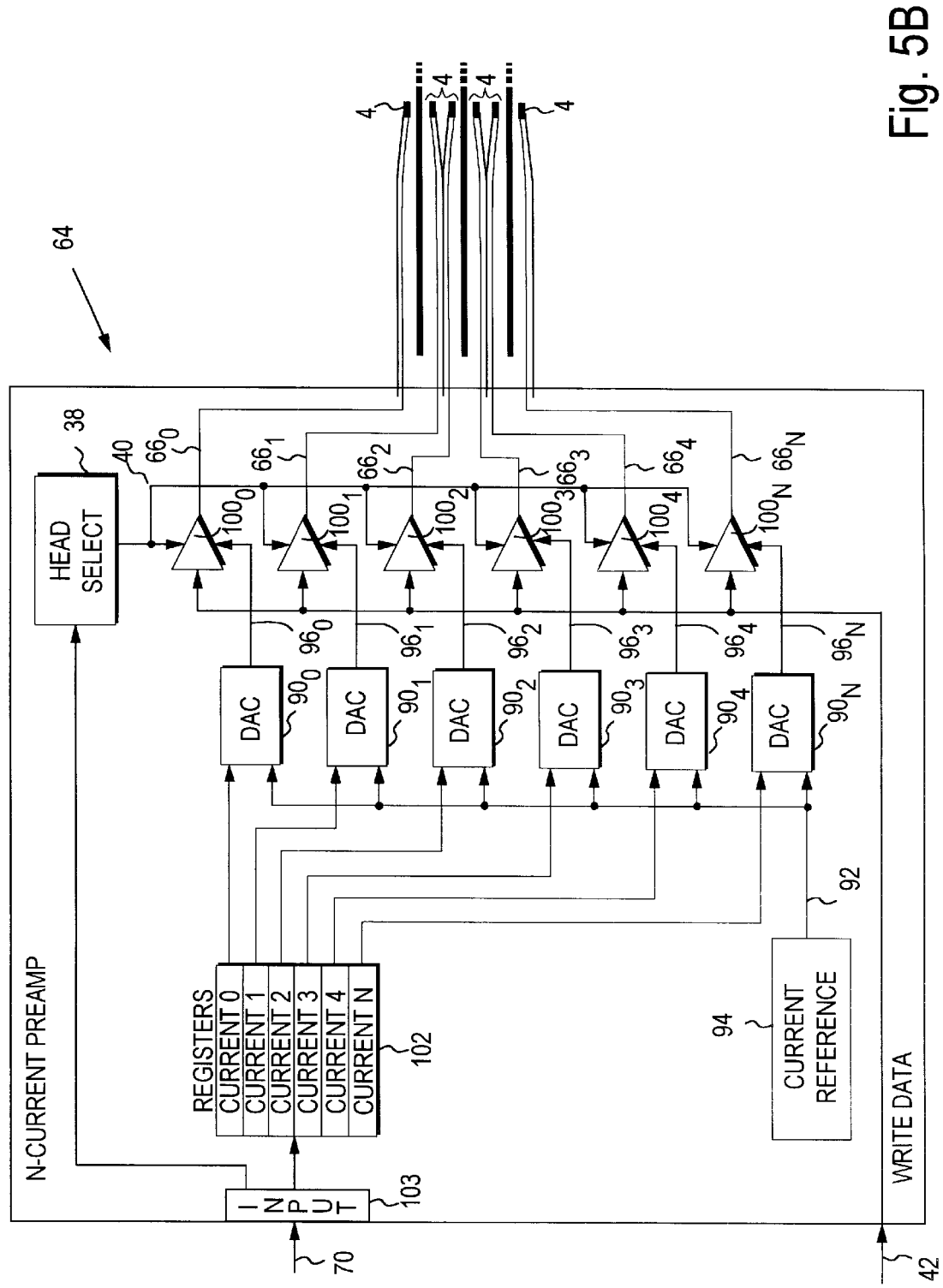
FIG. 5B shows one embodiment for the n-current preamplifier of FIG. 5A, wherein a plurality of registers store the current-setting control signals, and a plurality of digital-to-analog converters (DACs) and corresponding driver circuits constitute the signal-to-current converters for converting the current-setting control signals into independent write currents.

In the embodiment of the n-current preamplifier 64 shown in FIG. 5B, a plurality of DACs ($90_0$–$90_N$) driven by a common current reference 92 output by current reference generator 94 and a plurality of driver circuits ($100_0$–$100_N$) constitute the signal-to-current converters ($89_0$–$89_N$) of FIG. 5A. Each of the DACs ($90_0$–$90_N$) generates an independent analog write current setting ($96_0$–$96_N$) for independently setting the write current ($66_0$–$66_N$) for each head 4 through the plurality of driver circuits ($100_0$–$100_N$). The DACs ($90_0$–$90_N$) convert the current-setting control signals stored in registers 102 into the analog write currents settings ($96_0$–$96_N$). As described below with respect to FIG. 7A and 7B, the driver circuits ($100_0$–$100_N$) of FIG. 5B are modified to output independent write currents ($66_0$–$66_N$) corresponding to the analog write current settings ($96_0$–$96_N$) for each head 4 rather than output the same write current for all the heads as in the prior art preamplifier of FIG. 4. When writing data to target data sector on a recording surface during normal operation, the head select circuit 38 enables the output of the appropriate driver circuit ($100_0$–$100_N$) corresponding to the recording surface of the target data sector. When bank writing the servo sectors 18, the head select circuit 38 enables the outputs of all the driver circuits ($100_0$–$100_N$) so that the servo sectors 18 are simultaneously written to all of the recording surfaces in the bank servo write mode. The digital write data 42 to be recorded to the recording surface modulates the operation of the driver circuits ($100_0$–$100_N$) by alternating the polarity of the write currents ($66_0$–$66_N$). As explained in greater detail below with respect to FIG. 6A, the digital write data 42 is preferably implemented as a differential signal and the driver circuits ($100_0$–$100_N$) implemented as differential amplifiers.

It is desirable to implement the n-current preamplifier 64 efficiently and cost effectively, which means minimizing the number of external control pins as well as the internal circuitry. The number of external control pins can be minimized by providing a serial interface to the n-current preamplifier 64 both for the digital write data 42 as well as the control signals such as the current-setting control signals and head select control signal received over line 70. To minimize the internal circuitry, the following description provides two alternative embodiments for the n-current preamplifier 64 which reduce the circuitry associated with implementing the DACs ($90_0$–$90_N$) of FIG. 5B. The DACs ($90_0$–$90_N$) of FIG. 5B require numerous transistors to implement and therefore represent a significant portion of the internal circuitry in the n-current preamplifier 64. Because the DACs ($90_0$–$90_N$) are binary weighted, the number of transistors required to implement the higher order bits increases exponentially. However, the optimal write currents ($66_0$–$66_N$) for the individual heads 4 may differ by only a small amount which means that the higher order bits of the current-setting control signals (stored in registers 102) are all the same. This characteristic can be exploited to reduce the implementation cost of the DACs ($90_0$–$90_N$) shown in FIG. 5B while performing the same function.

Figure 5C:
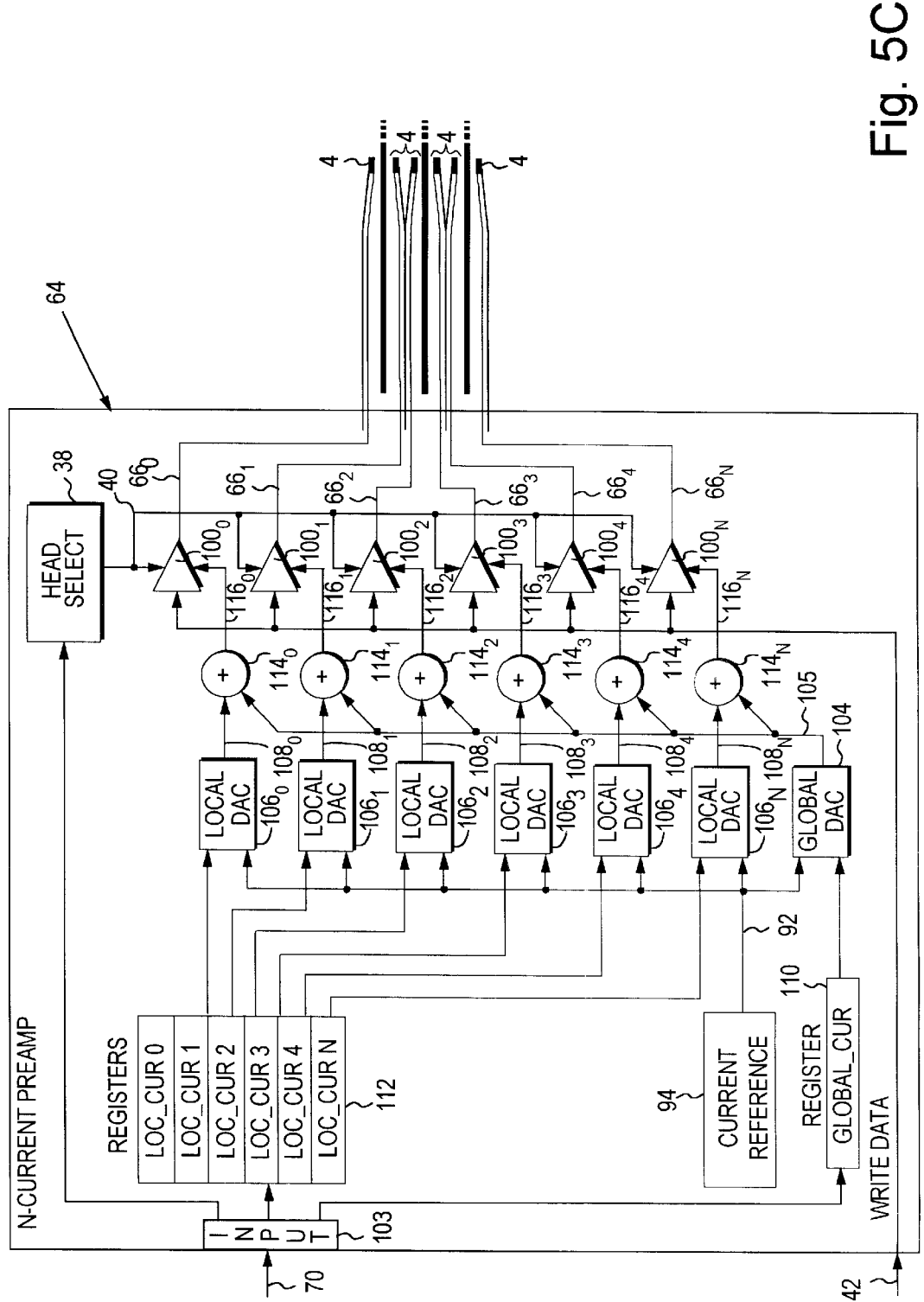
FIG. 5C illustrates an alternative embodiment for the n-current preamplifier of FIG. 5A, wherein the independent write currents are generated by adding a global (coarse) write current setting generated for all of the heads to a local (fine) write current setting for each head in order to reduce the circuitry in the DACs as compared to the implementation of FIG. 5B.

One embodiment of the n-current preamplifier 64 which reduces the DAC circuitry is shown in FIG. 5C wherein the individual DACs ($90_0$–$90_N$) of FIG. 5B have been replaced by a global DAC 104 for generating a global write current setting 105 (coarse write current setting), and a plurality of local DACs ($106_0$–$106_N$) for generating a plurality of local write current settings ($108_0$–$108_N$) (fine write current settings). Register 110 provides the global current-setting control signal to the global DAC 104, and registers 112 provide the local current-setting control signals to the local DACs ($106_0$–$106_N$). The global write current setting 105 output by the global DAC 104 is added to the local write current settings ($108_0$–$108_N$) output by the local DACs ($106_0$–$106_N$) at adders ($114_0$–$114_N$) to generate the analog write current settings ($116_0$–$116_N$) for controlling the write currents ($66_0$–$66_N$) output by the driver circuits ($100_0$–$100_N$). The global DAC 104 and the local DACs ($106_0$–$106_N$) are all driven by a common current source 92 output by current reference 94 so that the global DAC 104 and local DACs ($106_0$–$106_N$) track together variations in the current reference 92.

A calibration procedure (described below) is executed to determine the optimal values for the global current-setting control signal stored in register 110, as well as the local current setting control signals stored in registers 112. Suitably, the global current-setting control signal could be set to a minimum current-setting control signal corresponding to the head 4 that requires the least write current in the disk array, and then set the local current-setting control signals incrementally higher for the remaining heads. Alternatively, the global current-setting control signal could be set to a maximum write current corresponding to the head 4 that requires the most write current in the disk array, and then set the local current-setting control signals incrementally lower for the remaining heads 4. Accordingly, the adders ($114_0$–$114_N$) of FIG. 5C are designed to either add or subtract the local current settings ($108_0$–$108_N$) from the global current setting 105 to generate the analog write current settings ($116_0$–$116_N$) for controlling the driver circuits ($100_0$–$100_N$).

The accuracy of the write currents ($66_0$–$66_N$) for each head 4 in the disk array depends on the resolution and range of the local current-setting control signals, which depends on the number of bits used to represent the current-setting control signals. Typically, the resolution and range necessary to provide adequate performance is rather small so that only a few bits (1, 2 or 3) are needed to represent the local current-setting control signals. Because the digital circuitry internal to the n-current preamplifier 64 (buses, registers, etc.) are typically 8-bits wide, it would be inefficient to provide a separate 8-bit register for each of the local current-setting control signals. Thus, to further reduce the implementation cost of the n-current preamplifier 64 of FIG. 5C, registers 112, which are 8-bits wide, store multiple local current-setting control signals. For example, if two bits were used to represent each local current-setting control signal, then each 8-bit register 112 would store four 2-bit local setting control signals. For a disk drive comprising four heads 4, the n-current preamplifier 64 would require one 8-bit register 110 to store the global current-setting control signal, and one 8-bit register 112 for storing the four 2-bit local current-setting control signals.

Another alternative embodiment for the n-current preamplifier 64 of the present invention which reduces the circuitry associated with implementing the DACs ($90_0$–$90_N$) of FIG. 5B is shown in FIG. 5D. This embodiment employs a single register 118 and DAC 120 configuration, a plurality of sample-and-hold (S/H) circuits ($122_0$–$122_N$), and a switch 124 for applying the analog write current setting 126 output by the DAC 120 to the appropriate S/H circuit $122_n$. When writing user data to the disk during normal operation, register 118 is loaded with the appropriate current-setting control signal corresponding to the recording surface comprising the target data sector. The head select circuit 38 sets switch 124 over line 128 to select the corresponding S/H circuit $122_n$ which samples the analog write current setting 126 output by the DAC 120 and supplies it to the corresponding driver circuit $100_n$, the output of which is also enabled by the head select circuit 38 over line 40. When writing the embedded servo sectors 18 to the disks in the bank servo write mode, the appropriate write current ($66_0$–$66_N$) for each head 4 is set just prior to writing a servo sector 18 by performing the following steps: load the write current-setting control signal into register 118 for each head 4; program the head select circuit 38 to set switch 124 to select the appropriate S/H circuit $122_n$ to sample and hold the analog write current setting 126 at the output of the DAC 120; and once all of the write current settings 126 corresponding to each head have been sampled and are available at the outputs of the S/H circuits ($122_0$–$122_N$), program the head select circuit 38 to enable the output of all the driver circuits ($100_0$–$100_N$) to simultaneously write the servo sector 18 to all surfaces of the disks. Alternatively, the n-current preamplifier 64 of FIG. 5D could be implemented using a separate register 118 for each current-setting control signal which would avoid the latency in transferring the current-setting control signals from the disk controller 54 to register 118 in the n-current preamplifier 64 over the serial interface. Further, the n-current preamplifier 64 could be designed to continuously resample the analog write current setting 126 output by the DAC 120 to continuously refresh the analog write current settings ($116_0$–$116_N$) at the outputs of the S/H circuits ($122_0$–$122_N$) while writing the servo sector 18 to the recording surfaces, thereby compensating for loss in performance due to the S/H circuits ($122_0$–$122_N$) bleeding.

Those skilled in the art understand how to implement the conventional components (head select circuit, current source, registers, DAC, S/H, etc.) employed in the n-current preamplifier 64 of the embodiments shown in FIGS. 5B–5D. An example embodiment of the circuitry used to implement the driver circuits ($100_0$–$100_N$) of FIGS. 5B–5D is shown in FIG. 6A, and an example embodiment of the circuitry used to generate the independent write currents ($66_0$–$66_N$) output by the driver circuits ($100_0$–$100_N$) is shown in FIG. 7A and FIG. 7B.

Figure 6A:
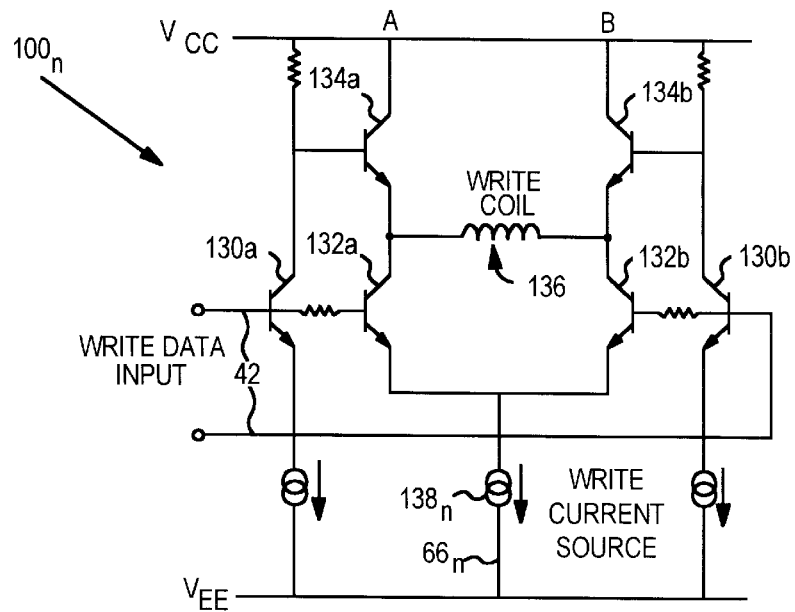
FIG. 6A illustrates an example embodiment for the driver circuits employed in the n-current preamplifier of FIGS. 5B–5D.

The driver circuit $100_n$ shown in FIG. 6A is a differential amplifier with the digital write data 42, implemented as a differential signal, as the differential input. A "1" bit in the digital write data 42 modulates a positive polarity in the differential input whereas a "0" bit modulates a negative polarity at the differential input. When the differential input is positive ("1" bit), transistors 130a, 132a and 134b are turned on while transistors 130b, 132b and 134a are turned off causing current to flow from $V_{CC}$ at point B through transistor 134b, through the write coil 136, and through transistor 132a to $V_{EE}$. When the differential input is negative ("0" bit), transistors 130b, 132b and 134a are turned on while transistors 130a, 132a and 134b are turned off causing current to flow from $V_{CC}$ at point A through transistor 134a, through the write coil 136, and through transistor 132b to $V_{EE}$. Thus, the polarity of the write current through the write coil 136 is reversed as modulated by the polarity of the differential input signal (i.e., the digital write data 42). The magnitude of the write current $66_n$ flowing through the write coil 136 for each head is controlled by a write current source $138_n$ in each driver circuit $100_n$, where each write current source $138_n$ is in turn controlled by the analog write current setting $116_n$ output by the DACs of FIG. 5B–5D.

Figure 6B:
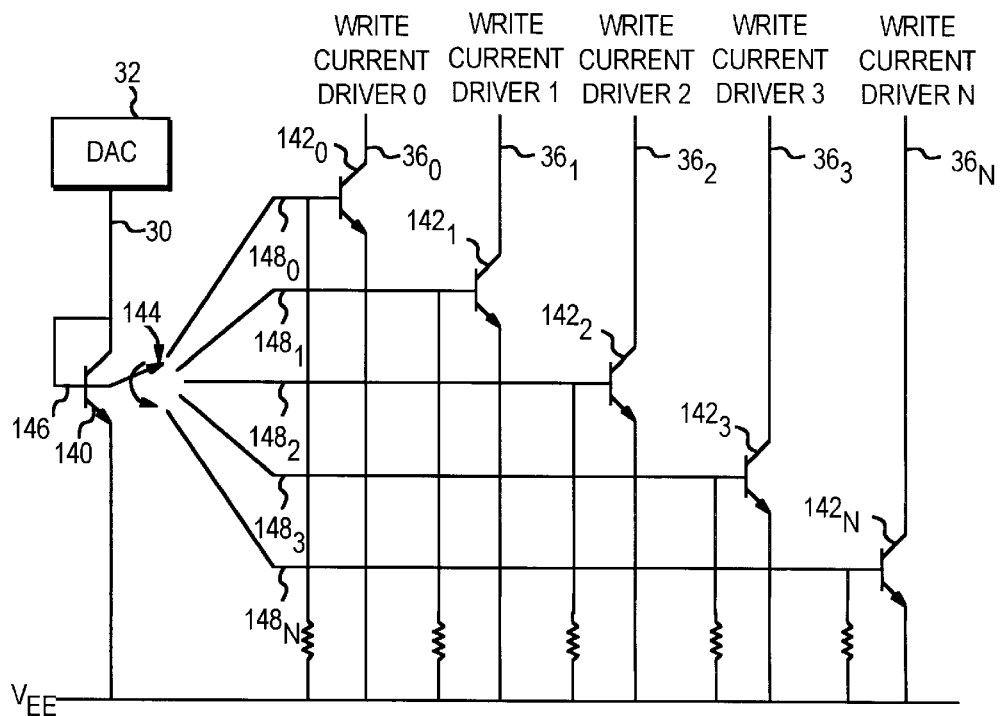
FIG. 6B illustrates a conventional circuit for generating the same write current for all the heads in the prior art preamplifier of FIG. 4.

A typical configuration for a prior art write current source employed in the driver circuits ($34_0$–$34_N$) of the prior art preamplifier of FIG. 4 is shown in FIG. 6B. This circuit implements a current mirror; the current 30 generated by the DAC 32 of FIG. 4 and flowing through transistor 140 is mirrored in a transistor ($142_0$–$142_N$) of the write current source in each of the driver circuits ($34_0$–$34_N$). When writing user data to a recording surface during normal operation, the head select circuit 38 of FIG. 4 controls the operation of a switch 144 in FIG. 6B to connect the base terminal 146 of transistor 140 to the base terminal $148_N$ of the appropriate transistor $142_n$ to enable the output of the appropriate driver circuit ($34_0$–$34_N$). When simultaneously writing the embedded servo sectors 18 to all surfaces of the disk during the bank servo write mode, the head select circuit 38 controls the switch 144 to connect the base terminal 146 of transistor 140 to all of the base terminals ($148_0$–$148_N$) of transistors ($142_0$–$142_N$) to simultaneously enable the output of all the driver circuits ($34_0$–$34_N$). Note that when bank servo writing the servo sectors, the write currents ($36_0$–$36_N$) generated by the driver circuit transistors ($142_0$–$142_N$) (in the prior art preamplifier of FIG. 4) are the same.

Figure 7A:
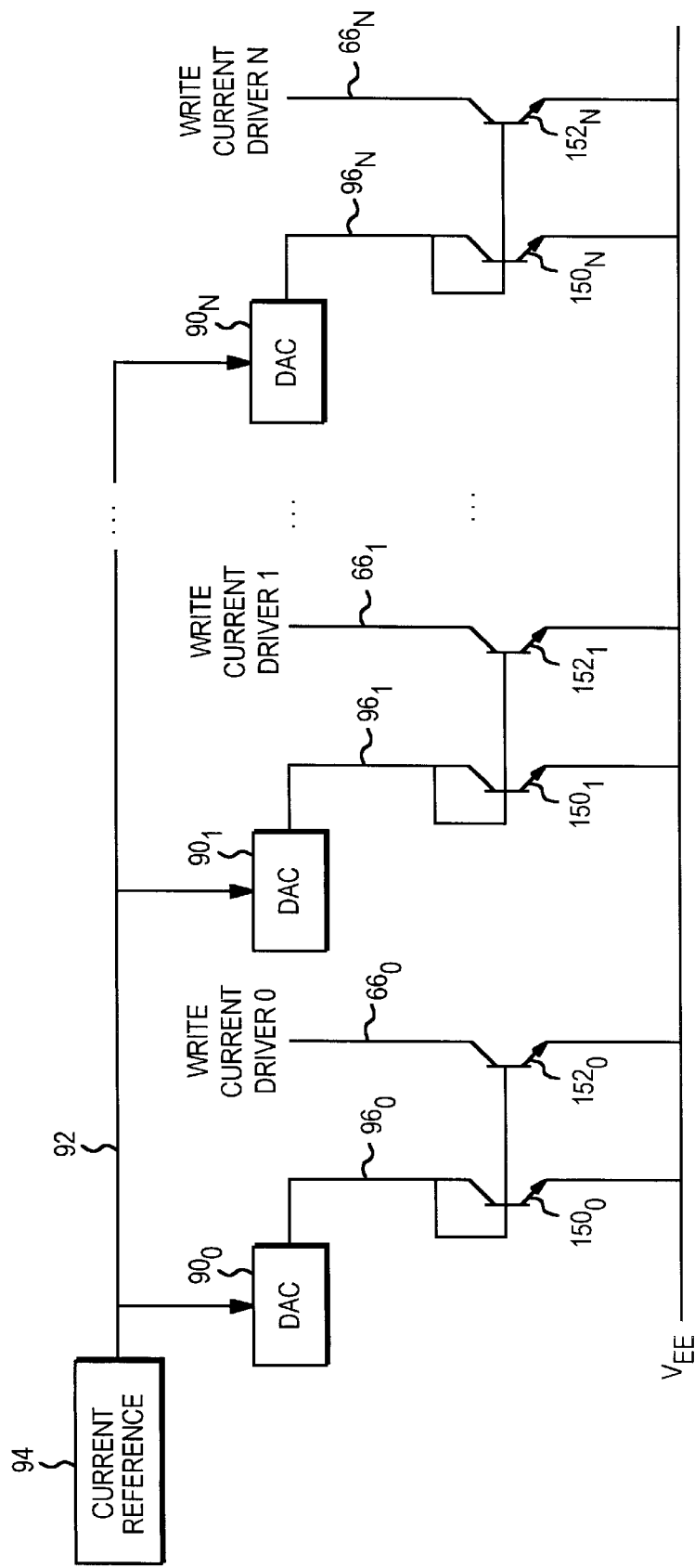
FIG. 7A shows an example circuit for generating the independent write currents for each driver circuit in the n-current preamplifier of FIG. 5B.
Figure 7B:
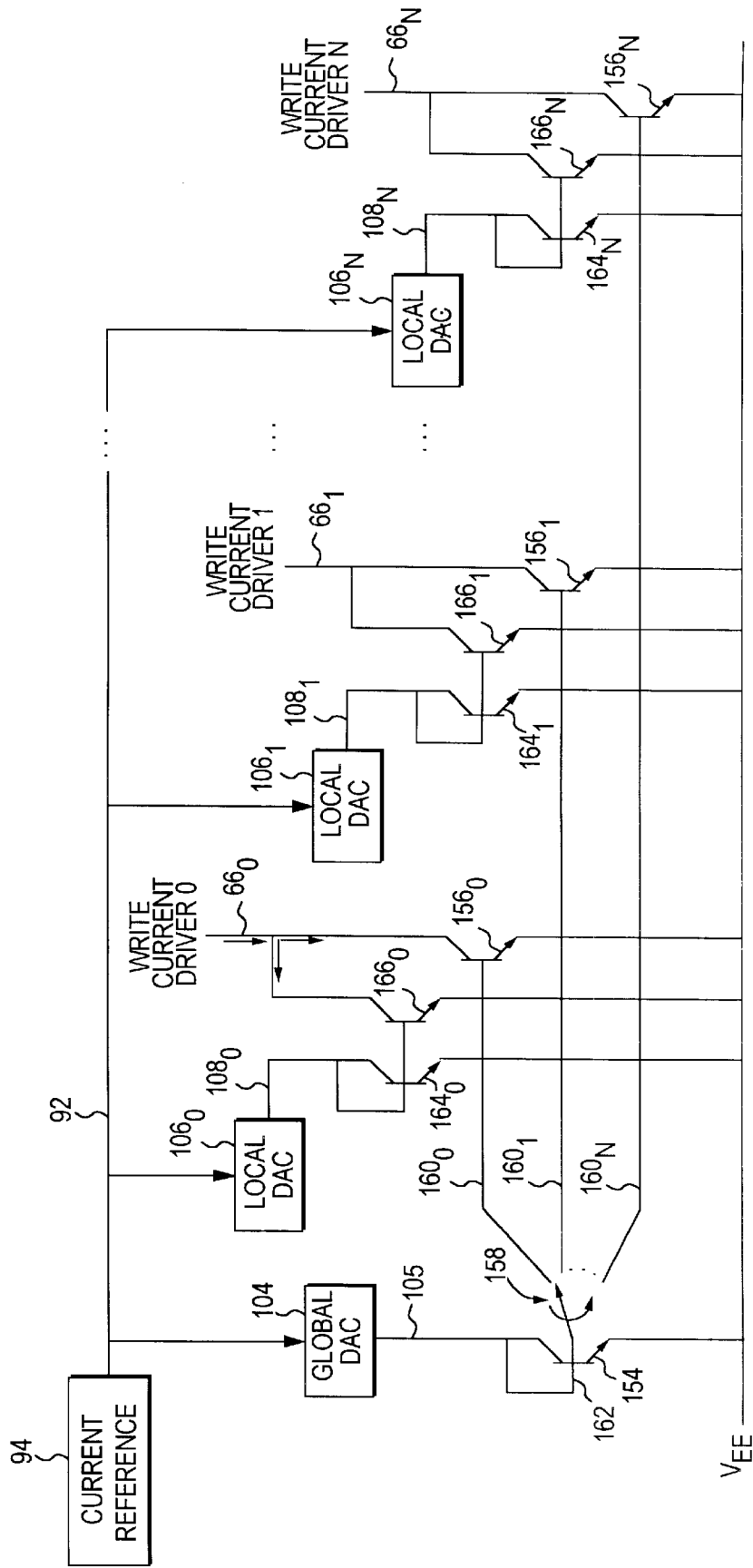
FIG. 7B shows an example circuit for generating the independent write currents for each driver circuit in the n-current preamplifier of FIG. 5C.

FIG. 7A shows an example embodiment for the circuit used to generate the independent write currents ($66_0$–$66_N$) output by the driver circuits ($100_0$–$100_N$) of the n-current preamplifier 64 shown in FIG. 5B. This circuit comprises a separate, independent current mirror for generating the write current $66_n$ in each of the driver circuits ($100_0$–$100_N$) of FIG. 6A. The output of each DAC ($90_0$–$90_N$) generates a current ($96_0$–$96_N$) in a respective transistor ($150_0$–$150_N$) which is then mirrored in a companion transistor ($152_0$–$152_N$) by connecting their base terminals as shown. In this manner, the write current for each of the driver circuits ($100_0$–$100_N$) is set separately and independently according to the outputs of the DACs ($90_0$–$90_N$).

FIG. 7B shows an example embodiment for the circuit used to generate the independent write currents ($66_0$–$66_N$) output by the driver circuits ($100_0$–$100_N$) of the n-current preamplifier 64 shown in FIG. 5C. This circuit comprises a global current mirror for generating the global (coarse) current setting for each of the driver circuits ($100_0$–$100_N$), and a separate local current mirror for generating the local (fine) current settings for each of the driver circuits ($100_0$–$100_N$). The global DAC 104 of FIG. 7B generates a current 105 in transistor 154 which is then mirrored in transistors ($156_0$–$156_N$) by connecting their respective base terminals through a switch 158. When writing user data to a recording surface during normal operation, the head select circuit 38 controls the switch 158 to connect the base terminal 162 of transistor 154 to the base terminal $160_n$ of the appropriate write current transistor ($156_0$–$156_N$). When bank servo writing the embedded servo sectors to all of the recording surfaces, the head select circuit 38 controls the switch 158 to connect the base terminal 162 of transistor 154 to the base terminals ($160_0$–$160_N$) of all of the write current transistors ($156_0$–$156_N$). The local current settings for each driver circuit ($100_0$–$100_N$) is generated by a local current mirror driven by the output of one of the local DACs ($106_0$–$106_N$). For example, the local current setting for the first driver circuit $100_0$ is generated by the current mirror formed by local DAC $106_0$ generating a current $108_0$ in transistors $164_0$ and mirrored in transistor $166_0$. The current flowing through transistors $166_0$ and $156_0$ are added to generate the write current $66_0$ for driver circuit $100_0$.

Write Current Calibration and Bank Servo Writing

A calibration procedure is preferably used for determining the appropriate current-setting control signals for providing the optimal write current ($66_0$–$66_N$) for each head 4 in the disk array before bank servo writing the servo sectors to the disks 2. The calibration procedure can be executed by the controller 87 in the external servo track writer shown in FIG. 3B. Alternatively, the calibration procedure can be executed by the disk controller 54 of FIG. 3 in a self-servowriting mode. In any event, the steps of the calibration procedure are performed for each head/surface combination, and it may optionally be carried out for different areas of each recording surface; for example, the appropriate current-setting control signal may be determined for each zone of the recording surface to compensate for variations in the magnetic characteristics from the inner to outer diameter tracks. In general, the calibration procedure involves adjusting the current-setting control signal for a particular head 4, providing the write current ($66_0$–$66_N$) for writing a test pattern to the recording surface, reading the test pattern from the recording surface, and generating a quality metric indicative of a quality of the current-setting control signal and the associated write current ($66_0$–$66_N$). These steps are iterated for several different current-setting control signals, and the current-setting control signal that generates the best (optimal) quality metric is selected as the optimal current-setting control signal for producing the write current to write the servo sectors.

The quality metric is preferably generated using discrete-time circuitry to facilitate adapting (programming) the calibration procedure to the various magnetic disks and heads found in the market. In the self-servo writing embodiment, the read/write channel 58 of FIG. 3C is preferably implemented using discrete-time circuitry to implement partial response/maximum likelihood (PRML) detection algorithms. A PRML read/write circuit comprises a channel calibration circuit for calibrating the optimal write currents for servo writing. Thus, FIG. 3C shows the read/write channel 58 generating a quality metric 74 that is supplied to the disk controller 54 which performs the calibration procedure when self-servowriting the recording surfaces.

Figure 8A:
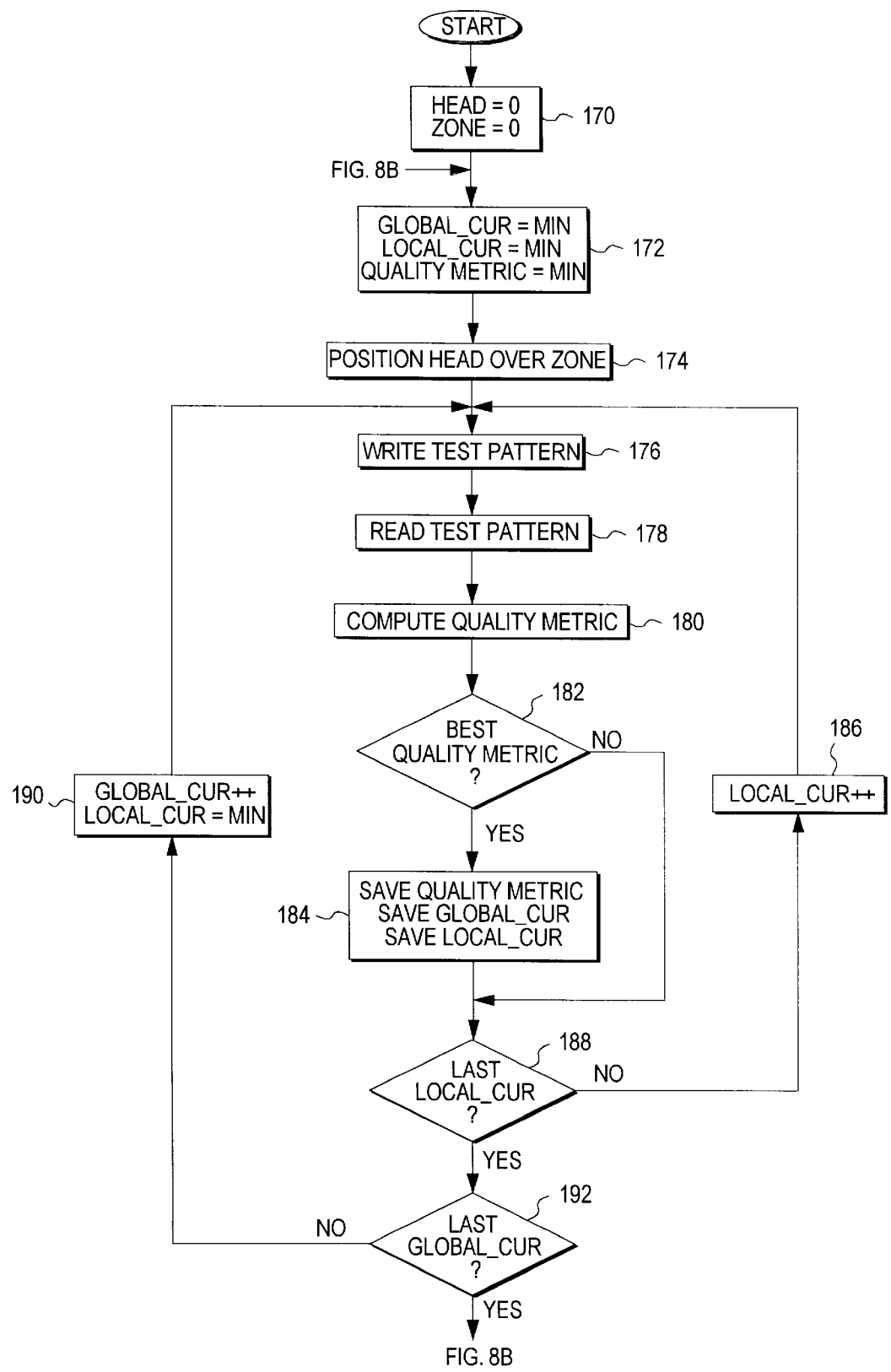
FIGS. 8A–8B are flow diagrams illustrating a write current calibration and bank servo writing procedure that employs the n-current preamplifier of FIG. 5 for calibrating independent write currents and simultaneously servo writing a plurality of recording surfaces.
Figure 8B:
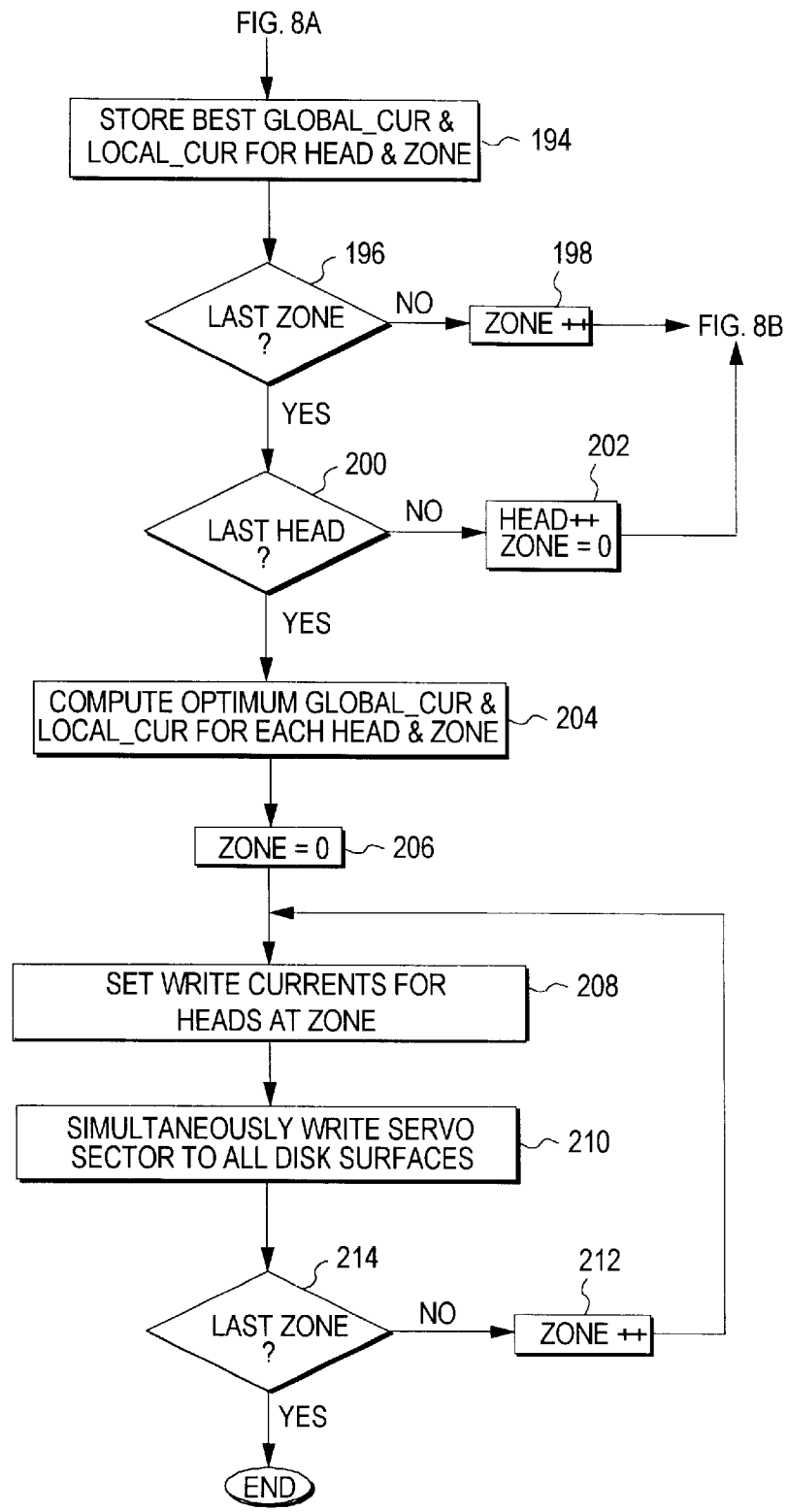

With reference to FIG. 8A and FIG. 8B, a write current calibration and bank servo write procedure 800 illustrates calibrating the n-current preamplifier 64 of FIG. 5C which comprises a global write current-setting control signal and a local write current-setting control signal; however, those skilled in the art are capable of modifying the flow diagrams to conform to the implementation of the n-current preamplifiers shown in FIG. 5B and FIG. 5D. In addition, the flow diagrams illustrate the calibration procedure performed for each zone on each surface of the disks, but this is not a necessary aspect of the embodiment. It may be sufficient to use a single write current for the entire recording surface, for example, an optimal write current measured at the center of the disk or an optimal write current computed from an average of several write currents measured at different locations on the recording surface (e.g., the average of write currents measured at the various zones).

Referring now to FIG. 8A, the first step 170 of the calibration procedure 800 is to initialize a variable HEAD, which represents the current head being calibrated, to zero (the first head), and to initialize a variable ZONE, which represents the current zone on the recording surface, to zero (the first zone). Then at step 172, a variable GLOBAL_CUR, which represents the global current-setting control signal stored in register 110 for the global DAC 104 of FIG. 5C, is set to a minimum; a variable LOCAL_CUR, which represents the local current setting control signal for a corresponding local current register 112 of FIG. 5C for the current head being calibrated, is set to a minimum; and a variable QUALITY METRIC, which represents the best quality metric measured for the current zone, is set to a minimum. At step 174 the HEAD being calibrated is positioned over the current ZONE, and at step 176 a test pattern is written to the disk. At step 178 the test pattern is read from the disk, and at step 180 a quality metric is measured in response to the test pattern.

One example quality metric that could be generated for use in the calibration procedure 800 is an "overwrite" measurement. An overwrite measurement is generated by:

DC erasing a track;

writing a first data sequence to the track;

reading the first data sequence to generate a first read signal having a low frequency signal component that depends on data in the first data sequence;

filtering the first read signal to extract the low frequency signal component, and measuring the energy in the low frequency signal component (energy-lowfreq);

storing in memory the measured energy in the low frequency signal component;

overwriting the first data sequence with a second data sequence;

reading the second data sequence to generate a second read signal; and filtering the second read signal to extract a residual low frequency signal component representing the residual of the low frequency signal component, and measuring the energy in the residual low frequency signal component (energy-lowfreq-residual).

The overwrite measurement (quality metric) is then computed as the ratio of the energy in the low frequency signal component to the energy in the residual low frequency signal component:

Quality Metric=energy-lowfreq/energy-lowfreq-residual.

The overwrite measurement is a good indication of how well the write current ($66_0$–$66_N$) saturates the recording surface, and therefore it is a good quality metric for use in calibrating the optimal write current ($66_0$–$66_N$) for writing servo sectors. The optimal write current (and best quality metric) is the minimum write current that achieves a predetermined overwrite measurement (e.g., 35–40 db).

Continuing now with the flow diagram of FIG. 8A, at step 182 the quality metric measured at step 180 is compared to the previous best measured QUALITY METRIC and, if better, then at step 184 the current quality metric is saved along with the global write current-setting control signal GLOBAL_CUR and local write current-setting control signal LOCAL_CUR. At step 186 the local write current-setting control signal LOCAL_CUR is incremented and a new quality metric is measured. This procedure is repeated until the last local write current-setting control signal has been tried at step 188, wherein at step 190 the global write current-setting control signal GLOBAL_CUR is incremented and the local write current-setting control signal LOCAL_CUR is reset to a minimum. Note that if the quality metric is the overwrite measurement described above, the loop will terminate as soon as the minimum write current ($66_0$–$66_N$) is found that generates the desired overwrite measurement rather than test all combinations of global and local current-setting control signals. After the last global current-setting control signal GLOBAL_CUR has been tested at step 192 (or the loop terminates early), then the flow diagram of FIG. 9B is executed.

At step 194 of FIG. 8B, the optimal global write current-setting control signal GLOBAL_CUR and local write current-setting control signal LOCAL_CUR saved at step 184 of FIG. 8A are stored in memory. If at step 196 the last zone has not been reached, then the ZONE variable is incremented at step 198 and the flow diagram of FIG. 8A is re-executed for the next zone on the current recording surface. If at step 200 the last head has not been calibrated, then at step 202 the HEAD variable is incremented, the ZONE variable is reset to zero, and the calibration procedure 800 is re-executed for the next head. After the last head has been calibrated, then at step 204 the optimal write current ($66_0$–$66_N$) for each head and in each zone are computed for the global write current-setting control signal and the local write current-setting control signals from the values stored in memory at step 194. For example, the global write current-setting control signal may be set to the minimum write current ($66_0$–$66_N$) calibrated for the disk array, and the local write current-setting control signals for the remaining heads set to an incremental offset added to the global write current-setting control signal.

After the global and local write current-setting control signals have been computed, the bank servo write operation is performed to simultaneously write the embedded servo sectors to all of the recording surfaces. At step 206 the ZONE variable is reset to zero to begin bank writing the recording surfaces at the first zone. Then at step 208 the global and local write current-setting control signals for each head are loaded into the n-current preamplifier 64 and at step 210 the bank servo write operation writes the embedded servo sectors to the tracks in the current zone on all the recording surfaces. The ZONE variable is then incremented at step 212, the global and local write current-setting control signals for the next zone are loaded into the n-current preamplifier 64 at step 208, and the bank servo write operation at step 210 writes the embedded servo sectors to the tracks in the next zone on all of the recording surfaces. This process is reiterated until the last zone on all the disks has been servo written (i.e., the last ZONE is reached at step 214 in FIG. 8B) wherein the bank servo write procedure terminates.

We claim:

1. A n-current preamplifier for use in a disk drive comprising a plurality of recording surfaces and a corresponding plurality of heads, the n-current preamplifier comprising:
   (a) an input for receiving a plurality of current-setting control signals corresponding to the plurality of heads; and
   (b) a plurality of signal-to-current converters for simultaneously converting the current-setting control signals into a plurality of write currents for the heads, wherein each write current has a magnitude that is independently controlled by a respective one of the current-setting control signals.

2. The n-current preamplifier as recited in claim 1, wherein at least one of the plurality of heads comprises a magneto-resistive (MR) read element.

3. The n-current preamplifier as recited in claim 1, wherein:
   (a) the current-setting control signals are digital control signals; and
   (b) the signal-to-current converters comprise:
      i. a plurality of digital-to-analog converters for converting the digital control signals into a plurality of analog write current settings; and
      ii. a plurality of driver circuits for converting the analog write current settings into the plurality of write currents.

4. The n-current preamplifier as recited in claim 1, wherein:

(a) the current-setting control signals comprise a global current-setting control signal and a plurality of local current-setting control signals;
(b) the global current-setting control signal specifies a coarse current setting for at least two of the plurality of heads;
(c) each local current-setting control signal specifies a fine current setting for a respective one of the heads; and
(d) the signal-to-current converters comprise:
  i. a global converter for converting the global current-setting control signal into a global write current setting;
  ii. a plurality of local converters for converting the local current-setting control signals into local write current settings;
  iii. a plurality of adders for adding the global write current setting to the local write current settings to generate a plurality of analog write current settings; and
  iv. a plurality of driver circuits for converting the analog write current settings into the plurality of write currents.

5. The n-current preamplifier as recited in claim 4, wherein:
(a) the global current-setting control signal and the local current-setting control signals are digital control signals;
(b) the global converter comprises a digital-to-analog converter for converting the global current-setting control signal into the global write current setting; and
(c) the local converters comprise a plurality of digital-to-analog converters for converting the local current-setting control signals into the local write current settings.

6. The n-current preamplifier as recited in claim 5, wherein the signal-to-current converters further comprise a common current source for generating a common current reference applied to at least two of the digital-to-analog converters.

7. The n-current preamplifier as recited in claim 5, further comprising:
(a) a first register for storing the global current-setting control signal; and
(b) a second register for storing at least two of the local current-setting control signals.

8. A disk drive comprising:
(a) a plurality of recording surfaces;
(b) a plurality of heads corresponding to the plurality of recording surfaces;
(c) a n-current preamplifier comprising:
  i. an input for receiving a plurality of current-setting control signals corresponding to the plurality of heads; and
  ii. a plurality of signal-to-current converters for simultaneously converting the current-setting control signals into a plurality of write currents for the heads, wherein each write current has a magnitude that is independently controlled by a respective one of the current-setting control signals.

9. The disk drive as recited in claim 8, wherein at least one of the plurality of heads comprises a magneto-resistive (MR) read element.

10. The disk drive as recited in claim 8, wherein:
(a) the current-setting control signals are digital control signals; and
(b) the signal-to-current converters comprise:
  i. a plurality of digital-to-analog converters for converting the digital control signals into a plurality of analog write current settings; and
  ii. a plurality of driver circuits for converting the analog write current settings into the plurality of write currents.

11. The disk drive as recited in claim 8, wherein:
(a) the current-setting control signals comprise a global current-setting control signal and a plurality of local current-setting control signals;
(b) the global current-setting control signal specifies a coarse current setting for at least two of the plurality of heads;
(c) each local current-setting control signal specifies a fine current setting for a respective one of the heads; and
(d) the signal-to-current converters comprise:
  i. a global converter for converting the global current-setting control signal into a global write current setting;
  ii. a plurality of local converters for converting the local current-setting control signals into local write current settings;
  iii. a plurality of adders for adding the global write current setting to the local write current settings to generate a plurality of analog write current settings; and
  iv. a plurality of driver circuits for converting the analog write current settings into the plurality of write currents.

12. The disk drive as recited in claim 11, wherein:
(a) the global current-setting control signal and the local current-setting control signals are digital control signals;
(b) the global converter comprises a digital-to-analog converter for converting the global current-setting control signal into the global write current setting; and
(c) the local converters comprise a plurality of digital-to-analog converters for converting the local current-setting control signals into the local write current settings.

13. The disk drive as recited in claim 12, wherein the signal-to-current converters further comprise a common current source for generating a common current reference applied to at least two of the digital-to-analog converters.

14. The disk drive as recited in claim 12, further comprising:
(a) a first register for storing the global current-setting control signal; and
(b) a second register for storing at least two of the local current-setting control signals.

* * * * *